US008712664B2

(12) United States Patent
Oosawa et al.

(10) Patent No.: US 8,712,664 B2
(45) Date of Patent: Apr. 29, 2014

(54) VEHICLE CONTROL APPARATUS

(75) Inventors: Toshiya Oosawa, Yokohama (JP); Hiroki Sonoda, Atsugi (JP); Akira Takahashi, Sagamihara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 224 days.

(21) Appl. No.: 13/283,001

(22) Filed: Oct. 27, 2011

(65) Prior Publication Data

US 2012/0150411 A1    Jun. 14, 2012

(30) Foreign Application Priority Data

Dec. 13, 2010    (JP) .................................. 2010-276484

(51) Int. Cl.
     *B60T 7/12*          (2006.01)
(52) U.S. Cl.
     USPC ............ 701/96; 440/12.6; 318/432; 180/446
(58) Field of Classification Search
     USPC ............ 701/96; 440/12.6; 318/432; 180/446
     See application file for complete search history.

(56) References Cited

U.S. PATENT DOCUMENTS 4,085,697 A * 4/1978 Gaasenbeek ................. 440/12.6
8,321,117 B2 * 11/2012 Sonoda et al. ................. 701/96
2001/0052756 A1 * 12/2001 Noro et al. .................... 318/432
2002/0148675 A1 * 10/2002 Higashira et al. ............. 180/446
2002/0173896 A1 * 11/2002 Ishizu et al. ................... 701/96
2011/0066350 A1 * 3/2011 Sonoda et al. ................. 701/96

FOREIGN PATENT DOCUMENTS

JP    2005-299704 A    10/2005
JP    2006-264646 A    10/2006
JP    2008-068752 A    3/2008

* cited by examiner

*Primary Examiner* — Muhammad Shafi
*Assistant Examiner* — Sanjeev Malhotra
(74) *Attorney, Agent, or Firm* — Foley & Lardner LLP

(57) ABSTRACT

In a vehicle control apparatus employing a first speed self-adjustment control system configured to control a speed of a host vehicle based on a first command value, in a manner so as to maintain a distance of the host vehicle from a preceding vehicle or to maintain a set speed, a second speed self-adjustment control system is provided for controlling the host vehicle's speed based on a second command value determined based on information about a lateral acceleration acting on the host vehicle. Also provided is a deceleration selector configured to select either one of the first and second command values, which selected command value produces a greater deceleration exerted on the host vehicle. A control unit is configured to control the host vehicle's speed by driving an actuator based on the selected command value.

6 Claims, 12 Drawing Sheets

| No | SITUATION | CONDITION | OUTPUT COMMAND VALUE G* | |
|---|---|---|---|---|
| | | | GFC COMMAND VALUE Ggfc | ACC COMMAND VALUE Gacc |
| 1 | FURTHER-STEERING | Ggfc (DECELERATION) < Gacc | ○ | |
| 2 | | Ggfc (DECELERATION) > Gacc | | ○ |
| 3 | STEERING-KEEPING | Ggfc (= 0) < Gacc | ○ | |
| 4 | | Ggfc (= 0) > Gacc | | ○ |
| 5 | RETURN-STEERING | Ggfc (ACCELERATION) < Gacc | ○ | |
| 6 | | Ggfc (ACCELERATION) > Gacc | | ○ |

ACC DESIRED VEHICLE SPEED

ACC DESIRED VEHICLE SPEED

VEHICLE CONTROL APPARATUS

TECHNICAL FIELD

The present invention relates to a vehicle control apparatus.

BACKGROUND ART

In recent years, there have been proposed and developed various vehicle control technologies enabling an automotive vehicle to travel on a curve without giving any feeling of incompatibility to vehicle occupants, while activating an adaptive cruise control function of an active cruise control (ACC) system. One such vehicle control technology has been disclosed in Japanese Patent Provisional Publication No. 2008-68752 (hereinafter is referred to as "JP2008-068752"). The vehicle controller disclosed in JP2008-068752 is configured to limit the host vehicle's speed to below a computed upper-limit vehicle speed, when the host vehicle is rounding a curve during adaptive cruise control. The computed upper-limit vehicle speed is set based on a given target lateral acceleration and a host vehicle's turning radius determined based on a steering wheel angle. However, it would be desirable to provide a vehicle control apparatus capable of ensuring a more enhanced driving stability and steering ability when an ACC-system equipped vehicle is rounding a curve.

SUMMARY OF THE INVENTION

It is, therefore, in view of the previously-described disadvantages of the prior art, an object of the invention to provide a vehicle control apparatus configured to more greatly enhance a driving stability and a steering ability when a host vehicle (a speed self-adjustment control system equipped vehicle) is rounding a curve.

In order to accomplish the aforementioned and other objects of the present invention, a vehicle control apparatus comprises a first speed self-adjustment control system configured to control a speed of a host vehicle based on a first command value, in a manner so as to maintain a distance of the host vehicle from a preceding vehicle or to maintain a set speed, a second speed self-adjustment control system configured to control the host vehicle's speed based on a second command value determined based on information about a lateral acceleration acting on the host vehicle, a deceleration selector configured to select either one of the first command value and the second command value, which selected command value is a deceleration command value for producing a greater deceleration exerted on the host vehicle, and a control unit configured to control the host vehicle's speed by driving an actuator based on the selected command value.

According to another aspect of the invention, a vehicle control apparatus comprises a vehicle-to-vehicle distance control system configured to drive an actuator based on a vehicle-to-vehicle distance control command value in a manner so as to maintain a preset distance of a host vehicle from a preceding vehicle, a constant-speed control system configured to drive the actuator based on a constant-speed control command value in a manner so as to maintain a preset speed of the host vehicle, a curve-turning vehicle speed control system configured to control a speed of the host vehicle based on a curve-turning vehicle speed control command value determined based on information about a lateral acceleration acting on the host vehicle, and a control unit configured to select, depending on a running condition of the host vehicle, either one of the vehicle-to-vehicle distance control command value, the constant-speed control command value, and the curve-turning vehicle speed control command value, and also configured to drive the actuator based on the selected command value of the three command values.

According to a further aspect of the invention, a vehicle control apparatus comprises a first speed self-adjustment control system configured to control a speed of a host vehicle by operating, based on a first command value, a braking system or a driving system, and by executing acceleration/deceleration control for the host vehicle in a manner so as to maintain a distance of the host vehicle from a preceding vehicle or to maintain a set speed, a second speed self-adjustment control system configured to control the host vehicle's speed by operating, based on a second command value determined based on information about a lateral acceleration acting on the host vehicle, the braking system or the driving system, and by executing acceleration/deceleration control for the host vehicle, a deceleration selector configured to select either one of the first command value and the second command value, which selected command value is a deceleration command value for producing a greater deceleration exerted on the host vehicle, during the deceleration control, an acceleration selector configured to select either one of the first command value and the second command value, which selected command value is an acceleration command value for producing a smaller acceleration exerted on the host vehicle, during the acceleration control, and a control unit configured to control the host vehicle's speed based on the selected command value, by operating the braking system when the selected command value is the deceleration command value selected by the deceleration selector and by operating the driving system when the selected command value is the acceleration command value selected by the acceleration selector.

The other objects and features of this invention will become understood from the following description with reference to the accompanying drawings.

DESCRIPTION OF THE PREFERRED EMBODIMENTS

[First Embodiment]

Figure 1:
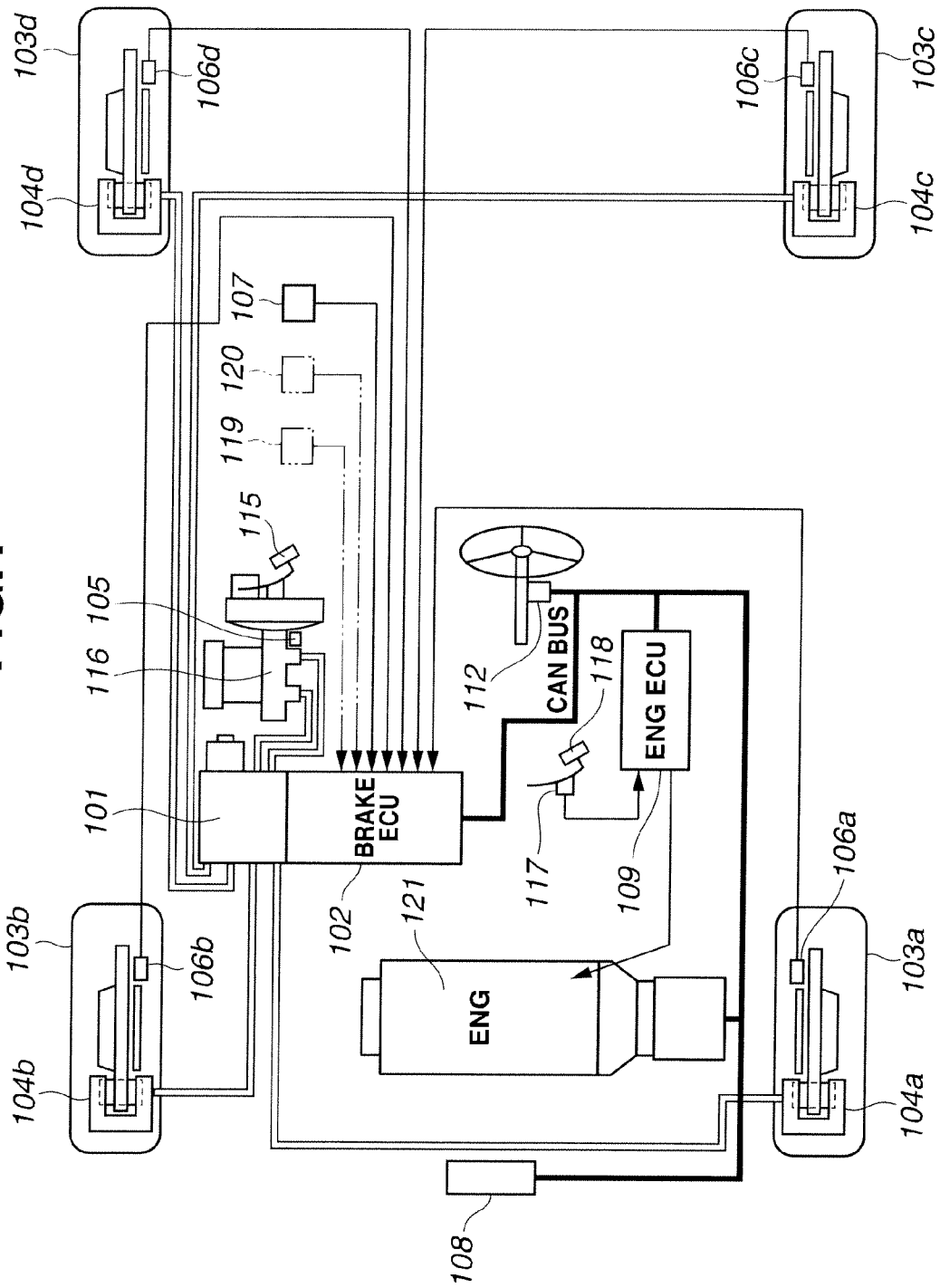
FIG. 1 is a system diagram illustrating an embodiment of a vehicle control apparatus.

The construction of the vehicle control apparatus of the first embodiment is hereunder described in reference to the system diagram of FIG. 1.

[System Configuration of First Embodiment]

Referring now to the drawings, particularly to FIG. 1, the vehicle control apparatus of the first embodiment is exemplified in an automotive vehicle control system with braking system interaction and engine-torque control system interaction (accelerator control system interaction or driving system interaction).

As shown in FIG. 1, a brake fluid pressure unit (an actuator, exactly, a hydraulic unit or a hydraulic modulator) 101 is configured to control brake-fluid pressures of a wheel-brake cylinder 104a of a front-left road wheel 103a, a wheel-brake cylinder 104b of a front-right road wheel 103b, a wheel-brake cylinder 104c of a rear-left road wheel 103c, and a wheel-brake cylinder 104d of a rear-right road wheel 103d, responsively to an operated amount of a brake pedal 115 by the driver (i.e., a driver's brake-pedal depression amount or an operated amount of the braking system) or a drive command from a brake ECU (electronic control unit) 102.

Brake ECU 102 is configured to generate an output command value G* of speed self-adjustment control (e.g., a desired deceleration), based on input informational data signals from a master-cylinder pressure sensor 105, wheel-speed sensors 106a, 106b, 106c, and 106d, an activation/deactivation switch (simply, an activation switch) 107, a camera (a forward situation recognition section) 108, a steering angle sensor (a steering state detection section) 112, a lateral-G sensor 119, and a longitudinal-G sensor 120, and also configured to calculate a brake-fluid-pressure command value and an engine-torque command value, both required for attaining the generated output command value G* of speed self-adjustment control. In the shown embodiment, steering angle sensor 112 serves as a steering state detection section. Brake ECU 102 is configured to drive the brake fluid pressure unit 101 based on a drive command corresponding to the calculated brake-fluid-pressure command value. Brake ECU 102 is also configured to send information about the calculated engine-torque command value via a controller area network (CAN) communications line to an engine ECU 109. Details of the "speed self-adjustment control" are described later.

Master-cylinder pressure sensor 105 is provided for detecting a pressure in a master cylinder 116, produced due to the operated amount of brake pedal 115 by the driver.

Wheel speed sensors 106a, 106b, 106c, and 106d are provided for detecting a rotational speed of each of road wheels 103a, 103b, 103c, and 103d, that is, each individual wheel speed. Also, a longitudinal acceleration Gx (described later) can be estimated based on information from wheel speed sensors 106a-106d in terms of the derivative dVw/dt of the detected wheel speed Vw. Alternatively, longitudinal acceleration Gx may be detected directly by longitudinal-G sensor 120.

Activation switch 107 is provided to switch between an activated state and a de-activated state of the "speed self-adjustment control" function. Activation switch 107 is manually operated with driver intervention.

Camera 108 is configured to detect a speed of a preceding vehicle, traveling ahead of a host vehicle (a speed-self-adjustment-control-system-equipped vehicle), and a relative longitudinal distance from the host vehicle to the preceding vehicle (i.e., a vehicle-to-vehicle distance), and also configured to send out information about the detected preceding vehicle speed and the detected vehicle-to-vehicle distance via the CAN communications line to the brake ECU 102.

Engine ECU 109 is configured to monitor an operated amount of an accelerator pedal 118 by the driver (i.e., an accelerator opening), which is detected by an accelerator position sensor 117, and also configured to control an engine (an actuator) 121 in a manner so as to generate an engine torque, corresponding to the detected accelerator operated amount. Additionally, in the case that an engine-torque command is sent from the brake ECU 102 via the CAN communications line to the engine ECU 109, the engine ECU 109 controls the engine 121 responsively to the engine-torque command from the brake ECU 102.

Steering angle sensor 112 is provided for detecting a driver's steering state, that is, a steering wheel angle (a steering angle). In lieu thereof, information from camera 108 and/or information from lateral-G sensor 119 may be used for steering state detection. Also, a lateral acceleration Gy (described later) can be estimated based on information from steering angle sensor 112. Alternatively, lateral acceleration Gy may be detected directly by lateral-G sensor 119.

[Speed Self-Adjustment Control]

As a speed self-adjustment control function, the vehicle control apparatus of the first embodiment uses two sorts of speed self-adjustment functions, namely, (i) an active cruise control (ACC) function (the first speed self-adjustment control) and (ii) a G flow control (GFC) function (the second speed self-adjustment control).

(1) Active Cruise Control (ACC Control)

Active cruise control (ACC control) involves (a) constant-speed running control (constant-speed control or normal cruise control) and (b) vehicle-to-vehicle distance control. Cruise control introduces a function, which controls a host vehicle's speed in a manner so as to maintain a set speed (i.e., a target vehicle speed) or a preset speed. Vehicle-to-vehicle distance control is often called "vehicle following control" or "adaptive cruise control". Vehicle-to-vehicle distance control introduces a function, which controls a host vehicle's speed by applying a longitudinal acceleration to the host vehicle in a manner so as to maintain a preset interrelation (e.g., a relative distance) between the preceding vehicle and the host vehicle.

In the first embodiment, when the preceding vehicle exists within a vehicle-to-vehicle distance control enabling range and the host vehicle's speed is less than an upper-limit vehicle speed under a condition where the accelerator and brakes are both shifted from their ON states (depressed states) to their OFF states (released states) under a state of activation switch 107 switched ON by the driver, vehicle-to-vehicle distance control is carried out. During execution of vehicle-to-vehicle distance control, a desired vehicle speed that the relative speed of the host vehicle to the preceding vehicle becomes zero is set and then speed feedback control is performed to bring the host vehicle's speed closer to the desired vehicle speed. An active-cruise-control (ACC) command value (i.e., the first command value) Gacc, corresponding to a command value of vehicle-to-vehicle distance control, is a longitudinal acceleration at which the host vehicle's speed can be brought closer to the desired vehicle speed, set such that the host vehicle's relative speed to the preceding vehicle becomes zero.

The previously-noted vehicle-to-vehicle distance control enabling range means a range between a minimum control enabling range (i.e., the product of a predetermined minimum headway time and the host vehicle's speed) and a maximum control enabling range (i.e., the product of a predetermined maximum headway time and the host vehicle's speed). Also, the host vehicle's speed can be determined based on or derived from sensor signal values generated from wheel-speed sensors 106a, 106b, 106c, and 106d. On the other hand, the upper-limit vehicle speed may be fixed to a preset vehicle speed value. In lieu thereof, the upper-limit vehicle speed may be set to a speed value obtained by adding a predetermined value to the host vehicle's speed, detected when an ON-to-OFF transition of the brakes as well as the accelerator occurs.

Conversely when the preceding vehicle does not exist within the previously-noted vehicle-to-vehicle distance control enabling range or when the host vehicle's speed has reached the upper-limit vehicle speed, cruise control (constant-speed control) is carried out. During execution of constant-speed control, the upper-limit vehicle speed is set as a desired vehicle speed, and then speed feedback control is performed to bring the host vehicle's speed closer to the desired vehicle speed (i.e., the upper-limit vehicle speed).

In the case of the previously-discussed vehicle-to-vehicle distance control, speed feedback control that the host vehicle's speed follows the preceding vehicle's speed is performed. Thus, assuming that the preceding vehicle continues to accelerate, the host vehicle has to accelerate for following the preceding vehicle. In this case, there is a possibility of an excessive host vehicle's speed rise that is not intended by the driver. A countermeasure against such an excessive host vehicle's speed rise is to limit a rising limit of host vehicle's speed to the upper-limit vehicle speed, thus suppressing an excessive speed rise of the host vehicle, which follows the preceding vehicle continuously accelerating. An active-cruise-control (ACC) command value (i.e., the first command value) Gacc, corresponding to a command value of constant-speed control, is a longitudinal acceleration at which the host vehicle's speed can be brought closer to the desired vehicle speed (the upper-limit vehicle speed).

(2) G Flow Control (GFC Control)

G flow control (GFC control) introduces a function, which controls the host vehicle's speed by application of a longitudinal acceleration to the host vehicle, based on information about a lateral acceleration acting on the host vehicle (concretely, a time rate of change Gy' in lateral acceleration acting on the host vehicle).

According to GFC control, when it has been determined, based on input information from steering angle sensor 112, that the host vehicle is entering from a straight lane into a curve or entering from a curve into a straight lane under a state of activation switch 107 switched ON by the driver, a longitudinal vehicle acceleration Gx can be produced based on information about a lateral vehicle acceleration Gy acting on the host vehicle (concretely, a time rate of change Gy' in lateral acceleration acting on the host vehicle). The state of the host vehicle's entry from a straight lane into a curve can be detected by an increase in steering wheel angle δ detected by steering angle sensor 112. In contrast, the state of the host vehicle's entry from a curve into a straight lane can be detected by a decrease in steering wheel angle δ.

In a range in which a lateral force acting on the tire on the road is proportional to a vertical load, that is, the normal reaction of the tire on the road which is equal to the negative of the normal force, a yawing moment Mzls, produced by a vehicle acceleration/deceleration during steady-state cornering (during steady-state turning), tends to be proportional to the product (Gy×Gx) of lateral acceleration Gy and longitudinal acceleration Gx, and thus yawing moment Mzls is represented by the following expression (1).

$$Mzls = -\{(mh)/g\}Gx \times Gy \quad (1)$$

where "m" denotes a vehicle weight, "h" denotes a center-of-gravity height, and "g" denotes a gravitational acceleration.

Therefore, the product {(Gy'/V)×Iz} of a value (Gy'/V), which value is obtained by dividing a time rate of change Gy' in lateral acceleration by a host vehicle's speed (simply, host vehicle speed) V, and a moment of inertia Iz about the z-axis of the vehicle axis system (x, y, z) is computed as a required yawing moment. The previously-discussed longitudinal acceleration Gx is determined such that the required yawing moment and a profile (i.e., a yawing moment based on informational data sets) realize the same yawing moment. Longitudinal acceleration Gx is determined by an operated amount of each of the accelerator and brakes, both operated depending on information about lateral acceleration Gy (concretely, a time rate of change Gy' in lateral acceleration) produced by the driver's steering operation, and hence the GFC control function is considered as integrated control between the vehicle motion in the longitudinal direction (i.e., in the x-axis direction) and the vehicle motion in the lateral direction (i.e., in the y-axis direction).

That is, the GFC control introduces a way to obtain a control guidance level for automatically operating the accelerator and brakes by the control system, depending on the driver's steering operation. Assuming that a yawing moment of inertia (a rotational moment of inertia about the z-axis) is denoted by "Iz", a value (Gy'/V), which value is obtained by dividing a time rate of change Gy' in lateral acceleration by a host vehicle speed V, is denoted as a reference yaw angular acceleration "$r_{ref}$'", and a proportional constant is denoted by "c", a GFC command value (the second command value) Ggfc, which is a command value of GFC control, that is, a curve-turning vehicle speed control command value, is based on the following expression (2) and thus represented by the following expression (3).

$$Iz \times r_{ref}' = Iz \times (Gy'/V) = c \times (-Mzls) = -c(mh/g) \cdot Ggfc \cdot Gy \quad (2)$$

$$Ggfc = -(gIz/cmhV)(Gy'/Gy) \quad (3)$$

Regarding the expression (3), when dividing the time rate of change Gy' in lateral acceleration by the lateral vehicle acceleration Gy, there is a tendency for the GFC command value Ggfc to become an excessively large value due to a small lateral acceleration Gy during the initial stage of steady-state turning. A situation where host vehicle speed V is slowing down, also shows the same tendency, that is, an excessive GFC command value Ggfc. To avoid this, the vehicle control system of the first embodiment utilizes the following expression (4) in which main information is acquired from the time rate of change Gy' in lateral acceleration and the other auxiliary information is acquired from host vehicle speed V and/or lateral acceleration Gy, or a function f(Gy, V) of lateral acceleration Gy and host vehicle speed V or a preprogrammed Gy-V-$K_{Gy,V}$ map showing the relationship among lateral acceleration Gy, host vehicle speed V, and a gain $K_{Gy,V}$.

$$Ggfc = f(Gy, V) \cdot Gy' = K_{Gy,V} \cdot Gy' \qquad (4)$$

The time rate of change Gy' in lateral acceleration is derived from a preprogrammed map, which map is univocally preprogrammed as a function f(δ', V) of a steering angular velocity δ' of the steering wheel and host vehicle speed V. The steering angular velocity δ' of the steering wheel can be arithmetically calculated as the derivative dδ/dt of steering wheel angle δ detected by steering angle sensor 112.

By controlling, based on the computed GFC command value Ggfc, the longitudinal vehicle acceleration, a yawing moment, occurring due to a load transfer in cornering, can be produced in a manner so as to approach closer to a reference yawing moment and thus the host vehicle's rotation about the z-axis and the host vehicle's revolution around a turn center of the turning host vehicle can be greatly balanced, thereby enhancing steering ability together with driving stability.

Figure 2:
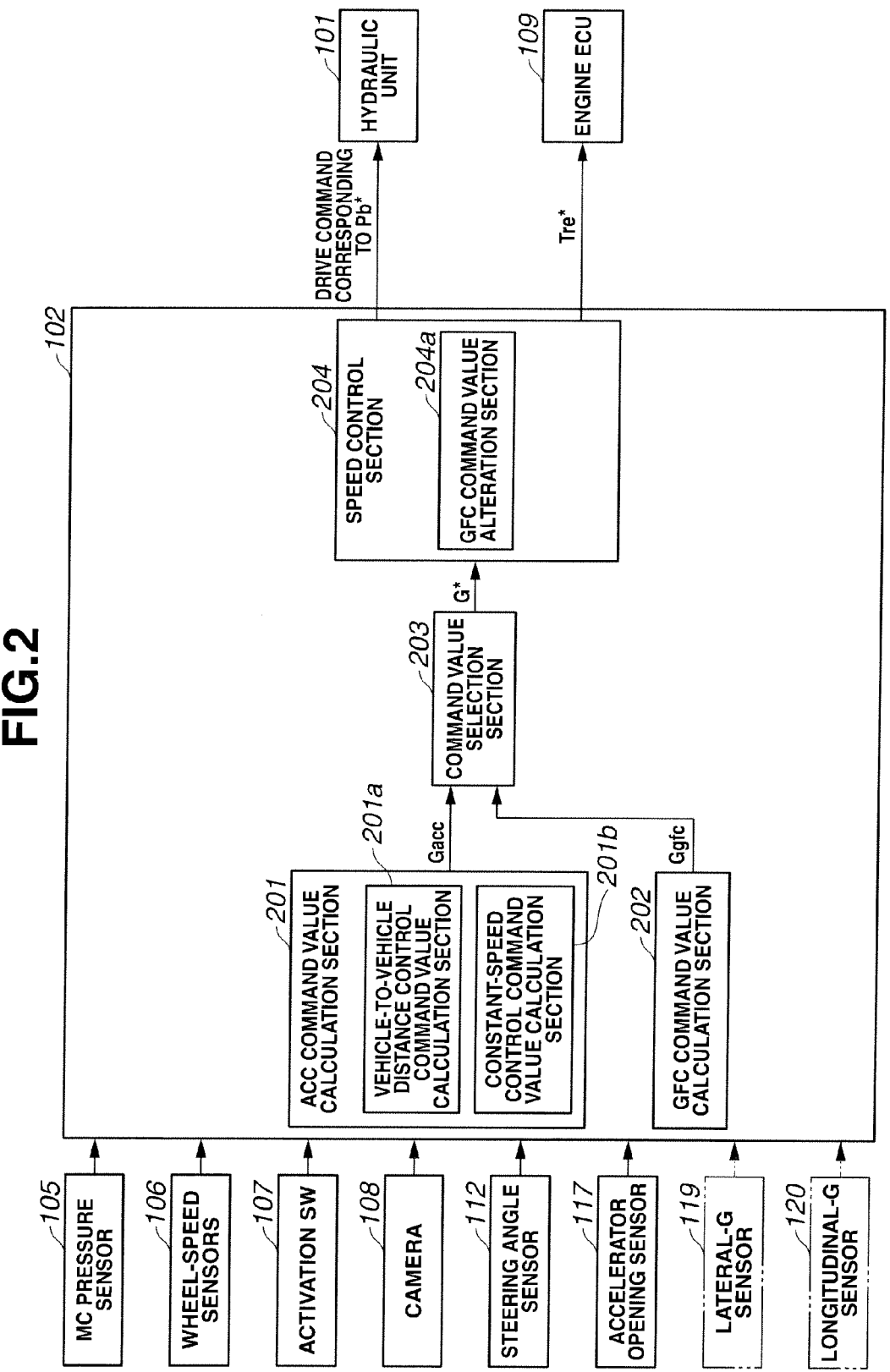
FIG. 2 is a control block diagram illustrating a brake ECU 102 included in the vehicle control apparatus of the embodiment.

Referring now to FIG. 2, there is shown the control block diagram of brake ECU 102 within which speed self-adjustment control is performed. Brake ECU 102 is comprised of an ACC command value calculation section (the first command value calculation section) 201, a GFC command value calculation section (the second command value calculation section) 202, a command value selection section (a deceleration selection section and an acceleration selection section) 203, and a speed control section 204.

ACC command value calculation section 201 receives information from master-cylinder pressure sensor 105, wheel-speed sensors 106a-106d, which are collectively referred to as "106", activation switch 107, and camera 108, and then a vehicle-to-vehicle distance control command value calculation section 201a of ACC command value calculation section 201 calculates an active-cruise-control (ACC) command value Gacc, corresponding to a command value of vehicle-to-vehicle distance control, during a vehicle-to-vehicle distance control mode, and also a constant-speed control command value calculation section 201b of ACC command value calculation section 201 calculates an active-cruise-control (ACC) command value Gacc, corresponding to a command value of constant-speed control, during a constant-speed control mode.

GFC command value calculation section 202 receives information from each individual wheel-speed sensor 106, activation switch 107, and steering angle sensor 112, and then calculates a GFC command value Ggfc.

Command value selection section 203 is configured to select either one of ACC command value Gacc and GFC command value Ggfc, so that a deceleration, produced by the selected command value and exerted on the host vehicle, is greater than a deceleration, produced by the unselected command value, or so that an acceleration, produced by the selected command value and exerted on the host vehicle, is less than an acceleration, produced by the unselected command value. Command value selection section 203 is further configured to generate the selected command value as an output command value G*.

Speed control section 204 is configured to calculate a brake-fluid-pressure command value of each individual wheel-brake cylinder 104a-104d, collectively referred to as "104", and/or an engine-torque command value of engine 121 responsively to the output command value G*, generated from command value selection section 203. Speed control section 204 is configured to drive the brake fluid pressure unit 101 responsively to a drive command, corresponding to the calculated brake-fluid-pressure command value, and also configured to relay the calculated engine-torque command value to engine ECU 109, for controlling an engine torque outputted by engine 121.

Speed control section 204 also includes a GFC command value alteration section (the second command value alteration section, that is, a curve-turning vehicle speed control command value alteration section) 204a provided for altering or compensating for GFC command value Ggfc. Under a condition where GFC command value Ggfc has been selected by means of command value selection section 203 as a command value that produces a smaller acceleration exerted on the host vehicle, GFC command value alteration section 204a is configured to set the output command value G* to a maximum value of GFC command value Ggfc regardless of ACC command value Gacc until such time host vehicle speed V has approached a vehicle speed Vt0 (desired vehicle speed) at a point of time of detection of the host vehicle's entry into a curve, and further configured to gradually reduce the output command value G* in a manner so as to bring host vehicle speed V closer to the vehicle speed Vt0 from a point of time immediately when host vehicle speed V has approached the vehicle speed Vt0 (desired vehicle speed) at the point of time of detection of the host vehicle's entry into a curve.

Command value selection section 203 and speed control section 204 construct a command-value selection/speed-control section that selects, depending on a running condition of the host vehicle, one of a vehicle-to-vehicle distance control command value, a constant-speed control command value, and a curve-turning vehicle speed control command value, and then appropriately controls, based on the selected control command value, the operation of brake fluid pressure unit 101 and the operation of engine 121, so as to control the host vehicle's speed.

[Speed Self-Adjustment Control Processing]

Figures 3, 4:
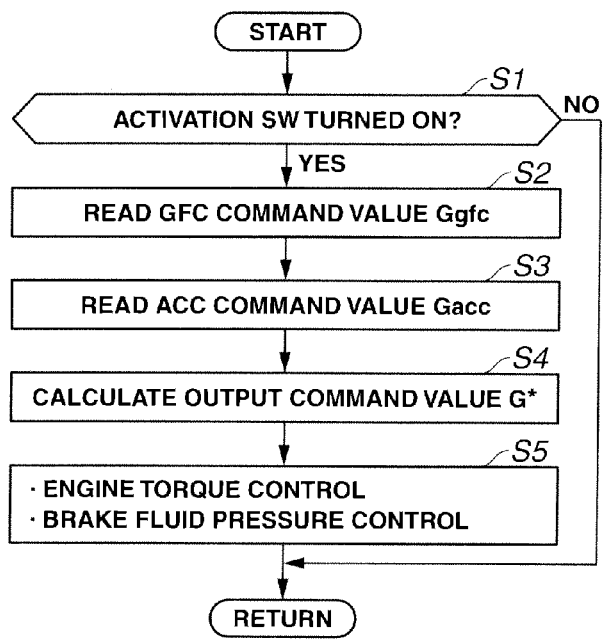
FIG. 3 is a flowchart illustrating a speed self-adjustment control routine executed within the brake ECU 102.
FIG. 4 is an explanatory view illustrating a method for calculating an output command value G*.
Figure 5:
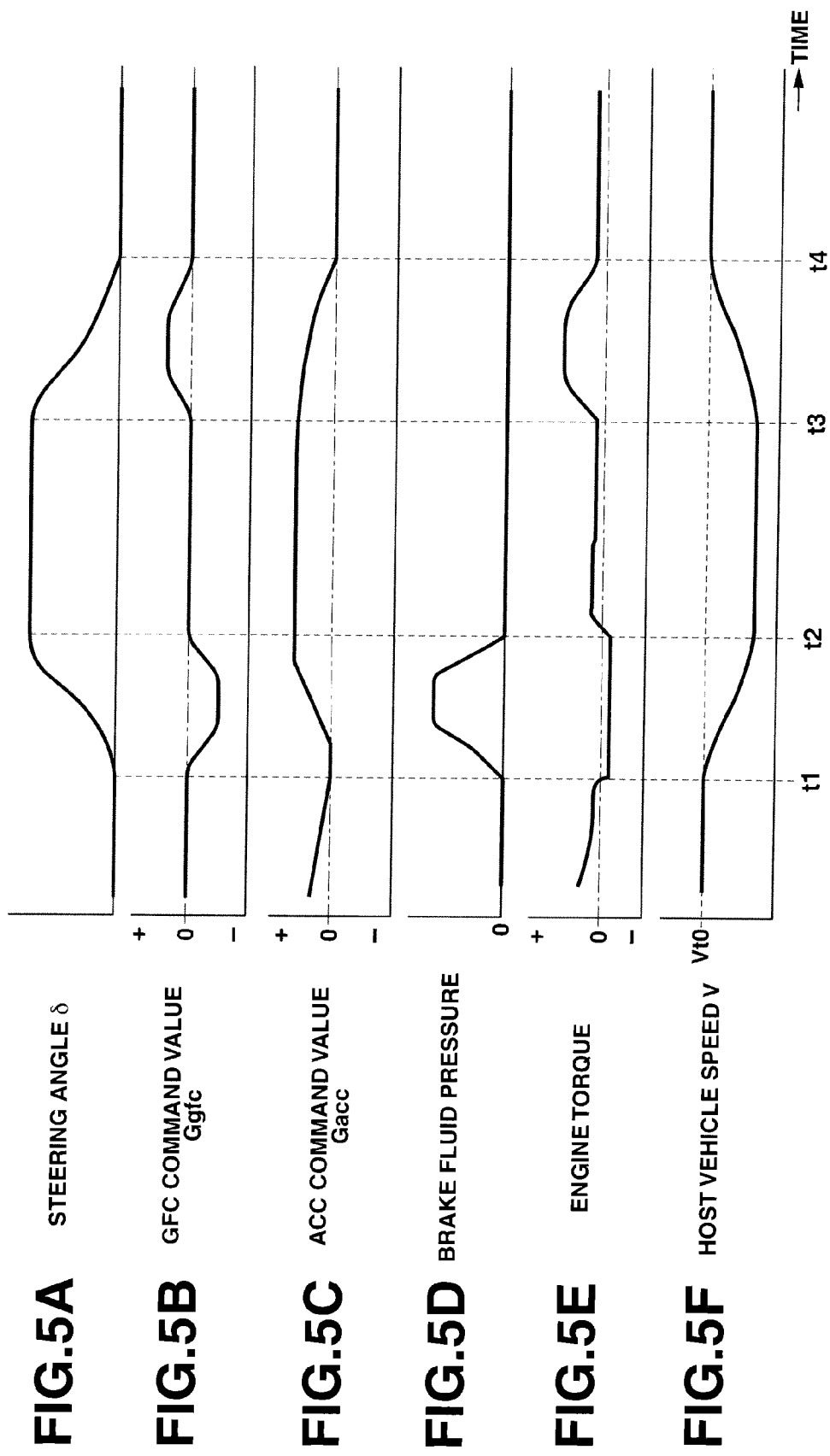
FIGS. 5A-5F are time charts illustrating speed self-adjustment control action when GFC control intervention has been made during cruise control, with no GFC command value alteration.

The speed self-adjustment control processing, executed within brake ECU 102, is hereunder described in detail in reference to the flowchart of FIG. 3.

At step S1, a check is made to determine whether activation switch 107 is turned ON. When the answer to step S1 is in the affirmative (YES), the routine proceeds to step S2. Conversely when the answer to step S1 is in the negative (NO), the current execution cycle of speed self-adjustment control processing terminates.

At step S2, GFC command value Ggfc, calculated by GFC command value calculation section 202, is read out.

At step S3, ACC command value Gacc, calculated by ACC command value calculation section 201, is read out.

At step S4, an output command value G* is calculated based on both the GFC command value Ggfc read at step S2 and the ACC command value Gacc read at step S3. The table of FIG. 4 shows the method for calculating the output command value G*. By the way, in the case of Ggfc=Gacc, the result of selection is the same, even if either the GFC command value Ggfc or the ACC command value Gacc is selected, and thus detailed description of such a case (i.e., Ggfc=Gacc) will be omitted in the table of FIG. 4.

Regarding the output-command-value G* calculation method shown in the table of FIG. 4, first, in the case of a further-steering state of the steering wheel (for instance, when the host vehicle enters into the curve), that is, in a decelerating mode that decelerates the host vehicle by either ACC control or GFC control, a lower one of GFC command value Ggfc and ACC command value Gacc, which lower command value produces a greater vehicle deceleration, is selected as an output command value G*. By the way, the positive sign (+) of each of GFC command value Ggfc and ACC command value Gacc means an acceleration, whereas the negative sign (−) of each of GFC command value Ggfc and ACC command value Gacc means a deceleration. For instance, the greater the absolute value |Ggfc| of the negative GFC command value (or the absolute value |Gacc| of the negative ACC command value), the greater the deceleration. In contrast, the greater the absolute value |Ggfc| of the positive GFC command value (or the absolute value |Gacc| of the positive ACC command value), the greater the acceleration.

Next, in the case of a steering-keeping state of the steering wheel (for instance, during steady-state turning), GFC command value Ggfc is basically set to "0" because of a less rate of change Gy' in vehicle lateral acceleration. Thus, in the steering-keeping state, the vehicle runs at a constant speed. However, in the case that ACC command value Gacc becomes shifted to a vehicle-deceleration side (i.e., a negative sign), that is, when a deceleration of the host vehicle is required due to a deceleration of the preceding vehicle during vehicle-to-vehicle distance control (during vehicle following control), ACC command value Gacc is selected as an output command value G*, even during the steering-keeping state.

In the case of a return-steering state of the steering wheel (for instance, when the host vehicle leaves the curve), that is, in an accelerating mode that accelerates the host vehicle by either ACC control or GFC control, a lower one of GFC command value Ggfc and ACC command value Gacc, which lower command value produces a smaller vehicle acceleration, is selected as an output command value G*. In a similar to the previously-discussed steering-keeping state, however, in the case that ACC command value Gacc becomes shifted to a vehicle-deceleration side (i.e., a negative sign), ACC command value Gacc is selected as an output command value G*, even during the return-steering state.

At step S5, an engine-torque command value Tre*, determined based on the output command value G* selected at step S4, is outputted to engine ECU 109 for executing engine-torque control, and a brake-fluid-pressure command value Pb*, determined based on the output command value G* selected at step S4, is outputted to brake fluid pressure control unit 101 for executing brake-fluid-pressure control. The method for calculating engine-torque command value Tre* and brake-fluid-pressure command value Pb*, both determined based on the selected output command value G* is hereinafter described in detail.

(1) When G*>0, that is, a vehicle-acceleration side:

$$Tre^* = G^* \times C + Tre0 \quad (5)$$

$$Pb^* = 0 \quad (6)$$

where "C" denotes an output-command-value-G*-to-engine-torque-value conversion factor, and "Tre0" denotes an engine torque value corresponding to a running resistance.

(2) When G*≤0, that is, a vehicle-deceleration side:

$$Tre^* = TreB \quad (7)$$

$$Pb^* = |G^*| \times K \quad (8)$$

where "TreB" denotes an engine torque value corresponding to engine braking and "K" denotes an output-command-value-G*-to-brake-fluid-pressure conversion factor.

The operation of the vehicle control system of the first embodiment is hereunder described.

Figure 6:
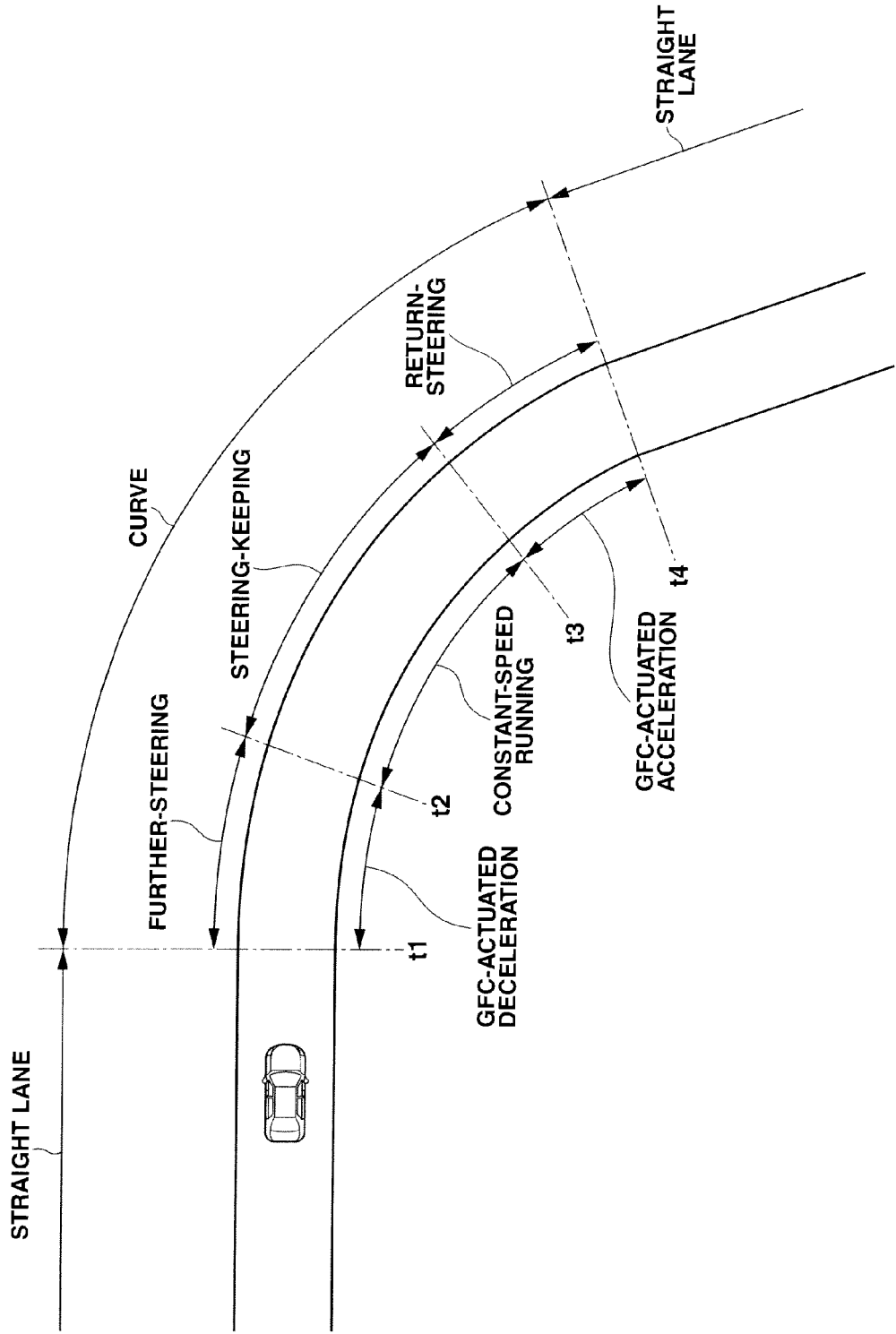
FIG. 6 is an explanatory view illustrating the relationship between a driver's steering state and an output command value G* when GFC control intervention has been made during cruise control, with no GFC command value alteration.
Figure 7:
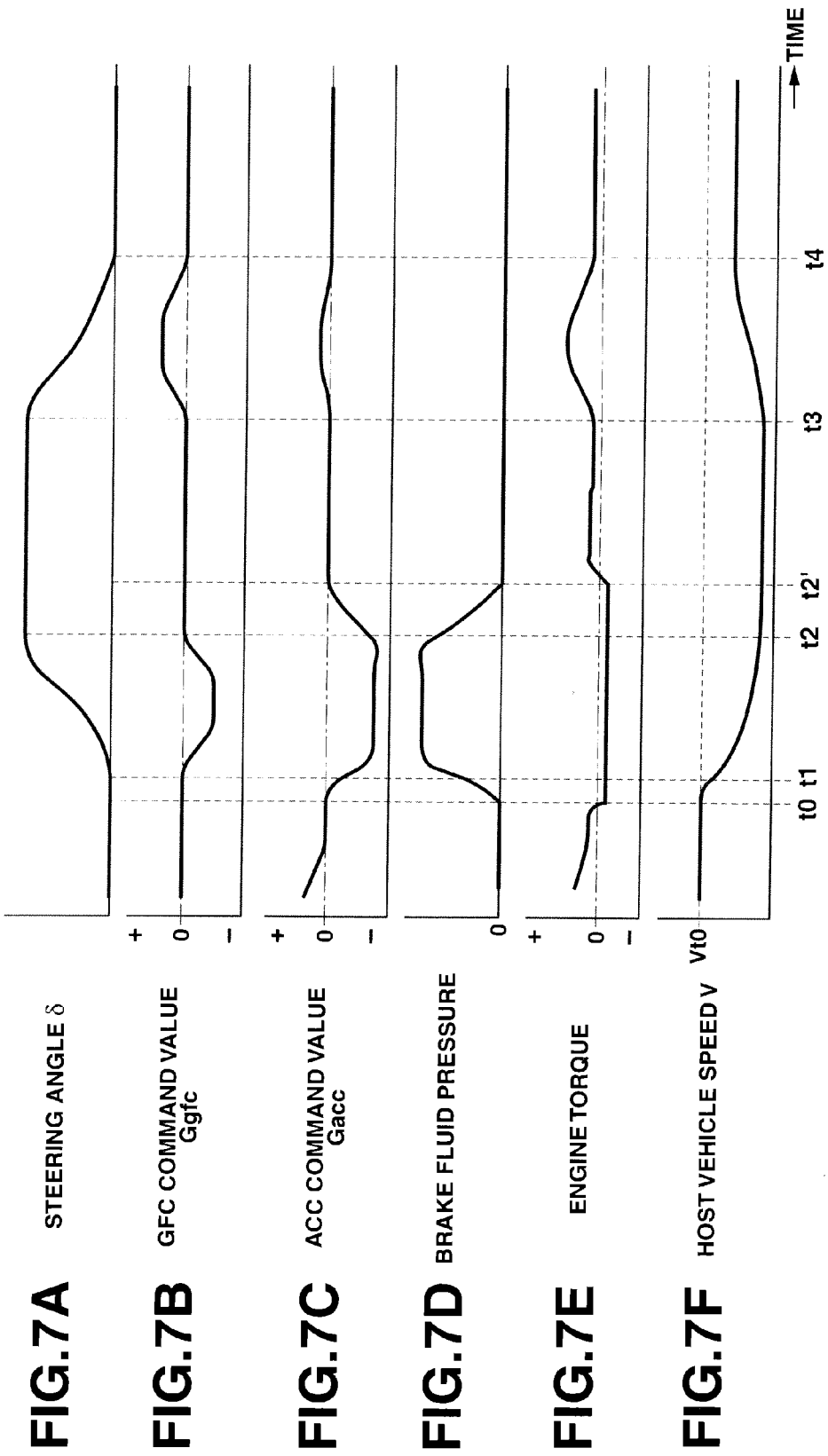
FIGS. 7A-7F are time charts illustrating speed self-adjustment control action when GFC control intervention has been made during vehicle-to-vehicle distance control (during adaptive cruise control), in a state where the preceding vehicle has decelerated, while entering a curve.

(1) With GFC control intervention during constant-speed control and with no GFC command value alteration:

FIGS. 5A-5F are time charts illustrating speed self-adjustment control action when GFC control intervention has been made during constant-speed control, whereas FIG. 6 is the explanatory view illustrating the relationship between the driver's steering state and output command value G* when GFC control intervention has been made during constant-speed control. Additionally, in this situation, suppose that there is no alteration of GFC command value Ggfc, executed within GFC command value alteration section 204a.

During the time period (t1-t2) from the point of time t1 to the point of time t2, a time rate of change Gy' in lateral acceleration acting on the host vehicle tends to increase due to further steering of the steering wheel (i.e., an increase in steering wheel angle δ) and thus GFC command value Ggfc tends to change to the vehicle-deceleration side (i.e., to the minus (−) side). In contrast, ACC command value Gacc tends to change to the vehicle-acceleration side (i.e., to the plus (+) side) required for returning host vehicle speed V to the vehicle speed Vt0 (desired vehicle speed) at the point of time of detection of the host vehicle's entry into a curve. As a result, GFC command value Ggfc is selected as an output command value G* and hence the host vehicle decelerates by the GFC control.

During the time period (t2-t3) from the point of time t2 to the point of time t3, the steering wheel angle is kept constant by the driver (i.e., δ'=0) and thus GFC command value Ggfc becomes "0". As a result, the host vehicle runs at a constant speed by the GFC control.

During the time period (t3-t4) from the point of time t3 to the point of time t4, a time rate of change Gy' in lateral acceleration acting on the host vehicle tends to decrease due to return steering of the steering wheel (i.e., a decrease in steering wheel angle δ) and thus GFC command value Ggfc tends to change (increase) to the vehicle-acceleration side (i.e., to the plus (+) side), but the magnitude of GFC command value Ggfc is less than that of ACC command value Gacc of constant-speed control. As a result, GFC command value Ggfc is selected as an output command value G* and hence the host vehicle accelerates by the GFC control.

Figure 8:
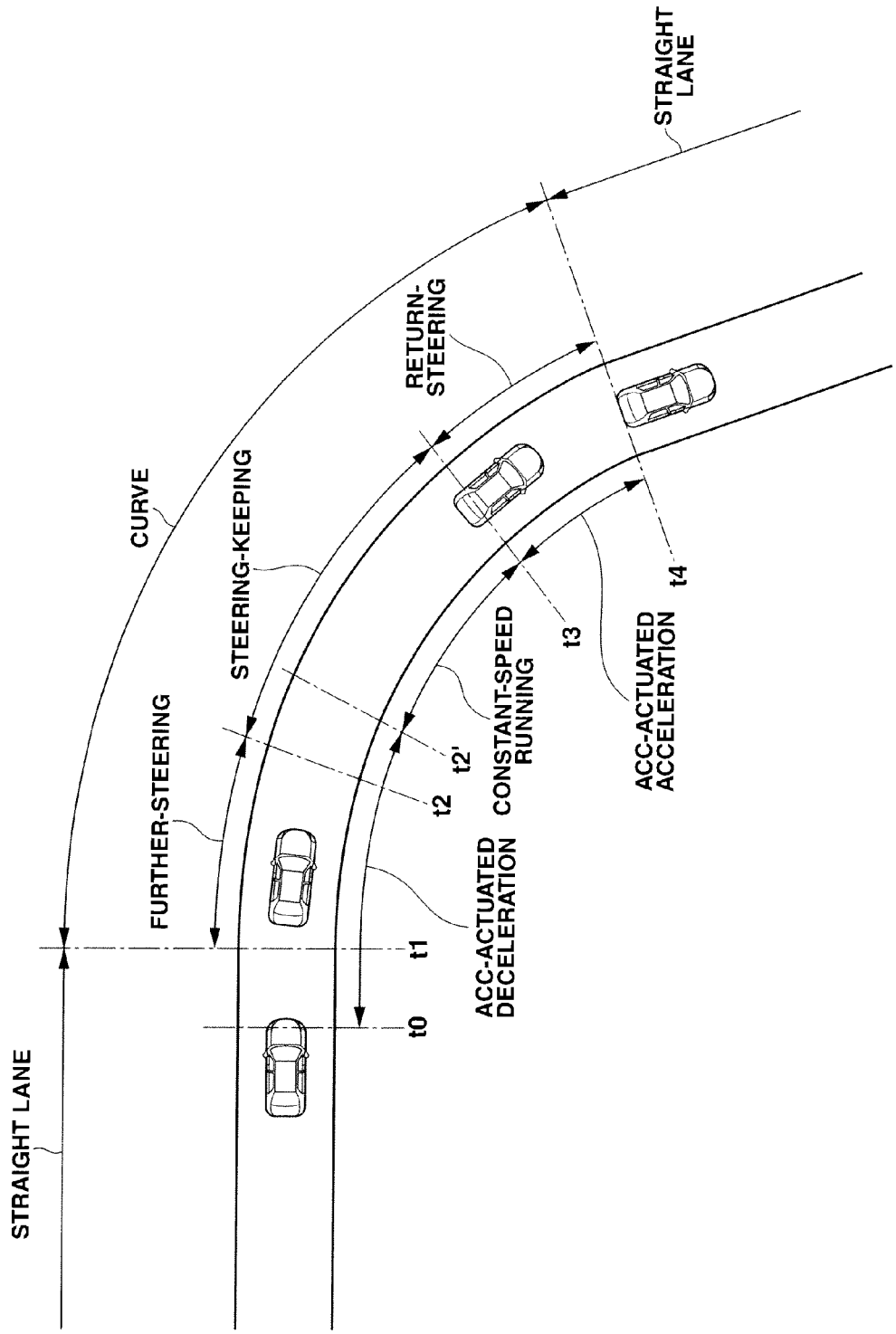
FIG. 8 is an explanatory view illustrating the relationship between a driver's steering state and an output command value G* when GFC control intervention has been made during vehicle-to-vehicle distance control, in a state where the preceding vehicle has decelerated, while entering a curve.
Figure 9:
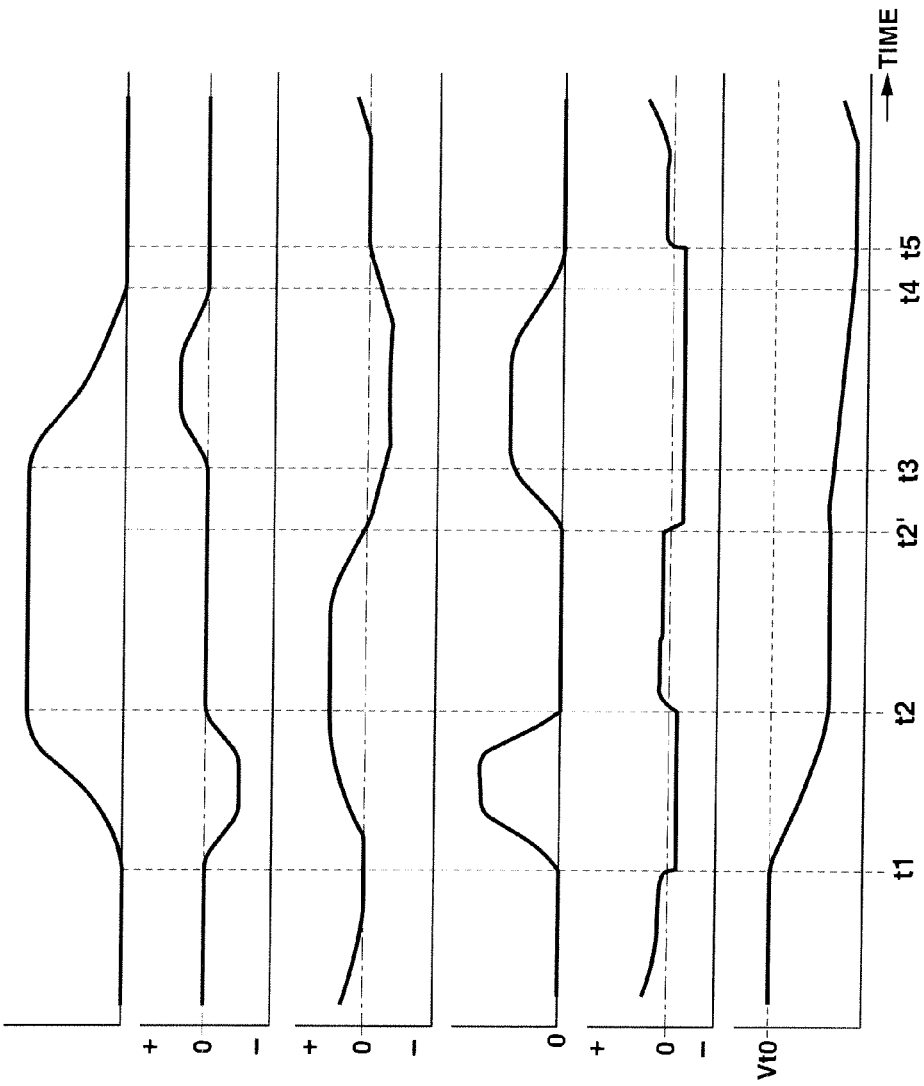
FIGS. 9A-9F are time charts illustrating speed self-adjustment control action when GFC control intervention has been made during vehicle-to-vehicle distance control, in a state where the preceding vehicle has entered a curve and thereafter decelerated.

(2) With GFC control intervention during vehicle-to-vehicle distance control in a state where the preceding vehicle has decelerated, while entering a curve:

FIGS. 7A-7F are time charts illustrating speed self-adjustment control action when GFC control intervention has been made during vehicle-to-vehicle distance control, whereas FIG. 8 is the explanatory view illustrating the relationship between the driver's steering state and output command value G* when GFC control intervention has been made during vehicle-to-vehicle distance control. Additionally, in this situation, suppose that the preceding vehicle has decelerated, while entering a curve.

During the time period (t1-t2) from the point of time t1 to the point of time t2, a time rate of change Gy' in lateral acceleration acting on the host vehicle tends to increase due to further steering of the steering wheel (i.e., an increase in steering wheel angle δ) and thus GFC command value Ggfc tends to change to the vehicle-deceleration side (i.e., to the minus (−) side). On the other hand, ACC command value Gacc of vehicle-to-vehicle distance control tends to more greatly change to the vehicle-deceleration side (i.e., to the minus (−) side), due to the deceleration of the preceding vehicle. Thus, GFC command value Ggfc becomes greater than ACC command value Gacc, that is, Ggfc>Gacc. As a result, ACC command value Gacc is selected as an output command value G* and hence the host vehicle decelerates by the vehicle-to-vehicle control of active cruise control (ACC control).

During the time period (t2-t2') from the point of time t2 to the point of time t2', the steering wheel angle is kept constant by the driver (i.e., δ'=0) and thus GFC command value Ggfc becomes "0", but ACC command value Gacc of vehicle-to-vehicle distance control still exists on the vehicle-deceleration side (i.e., on the minus (−) side). As a result, ACC command value Gacc is selected as an output command value G* and hence the host vehicle continues to decelerate by the ACC control.

During the time period (t2'-t3) from the point of time t2' to the point of time t3, the relative speed of the host vehicle to the preceding vehicle becomes "0" and thus ACC command value Gacc becomes "0". As a result, the host vehicle runs at a constant speed by the ACC control.

During the time period (t3-t4) from the point of time t3 to the point of time t4, a time rate of change Gy' in lateral acceleration acting on the host vehicle tends to decrease due to return steering of the steering wheel (i.e., a decrease in steering wheel angle δ) and thus GFC command value Ggfc tends to change (increase) to the vehicle-acceleration side (i.e., to the plus (+) side), but the magnitude of ACC command value Gacc (on the same plus (+) side) of vehicle-to-vehicle control is less than that of GFC command value Ggfc. As a result, ACC command value Gacc is selected as an output command value G* and hence the host vehicle accelerates by the vehicle-to-vehicle distance control of ACC control.

Figure 10:
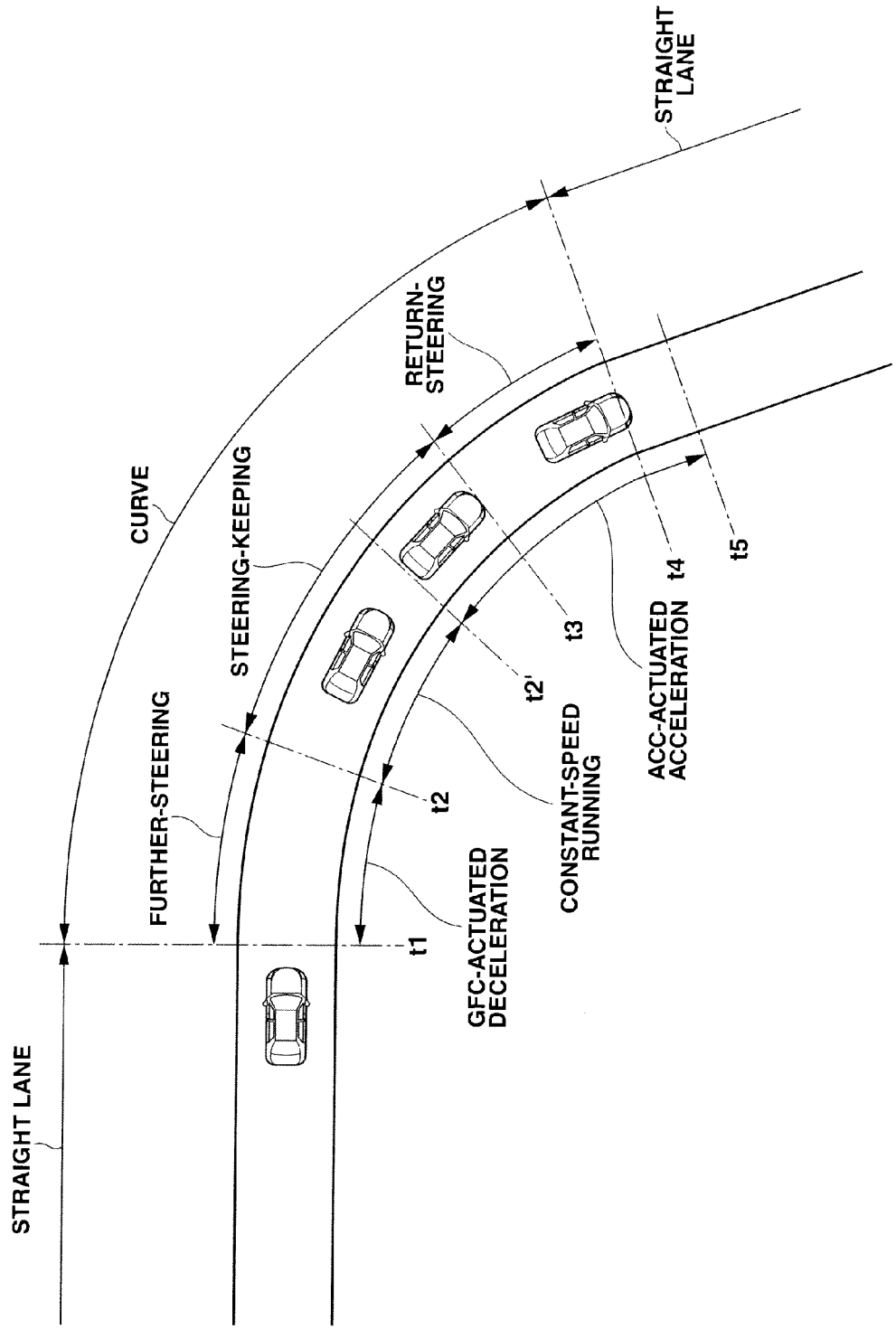
FIG. 10 is an explanatory view illustrating the relationship between a driver's steering state and an output command value G* when GFC control intervention has been made during vehicle-to-vehicle distance control, in a state where the preceding vehicle has entered a curve and thereafter decelerated.
Figure 11:
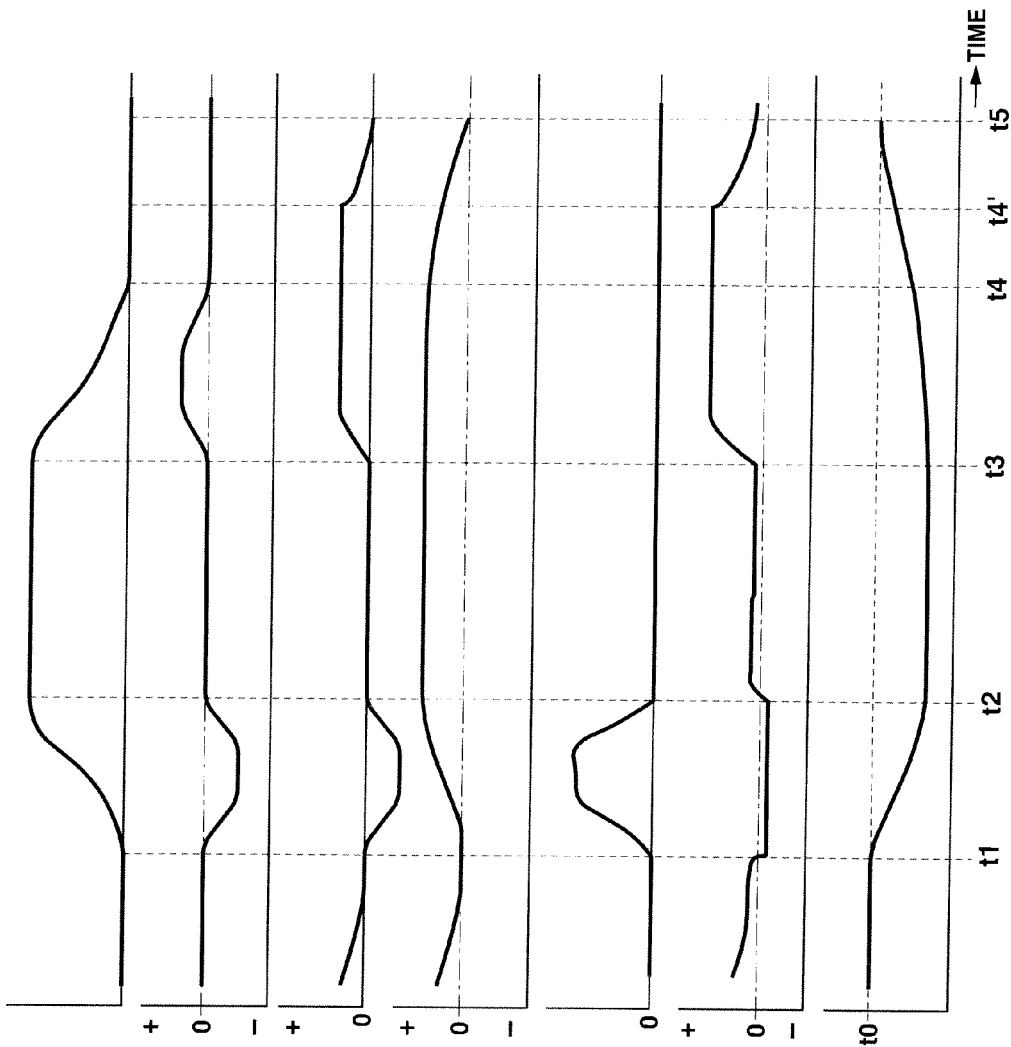
FIGS. 11A-11G are time charts illustrating speed self-adjustment control action when GFC control intervention has been made during cruise control, with a GFC command value alteration.

(3) With GFC control intervention during vehicle-to-vehicle distance control in a state where the preceding vehicle has entered a curve and thereafter decelerated:

FIGS. 9A-9F are time charts illustrating speed self-adjustment control action when GFC control intervention has been made during vehicle-to-vehicle distance control, whereas FIG. 10 is the explanatory view illustrating the relationship between the driver's steering state and output command value G* when GFC control intervention has been made during vehicle-to-vehicle distance control. Additionally, in this situation, suppose that the preceding vehicle has entered a curve and thereafter decelerated.

During the time period (t1-t2) from the point of time t1 to the point of time t2, a time rate of change Gy' in lateral acceleration acting on the host vehicle tends to increase due to further steering of the steering wheel (i.e., an increase in steering wheel angle δ) and thus GFC command value Ggfc tends to change to the vehicle-deceleration side (i.e., to the minus (−) side). In contrast, ACC command value Gacc tends to change to the vehicle-acceleration side (i.e., to the plus (+) side) required for increasing the host vehicle speed V to the preceding vehicle's speed. As a result, GFC command value Ggfc is selected as an output command value G* and hence the host vehicle decelerates by the GFC control.

During the time period (t2-t2') from the point of time t2 to the point of time t2', the steering wheel angle is kept constant by the driver (i.e., δ'=0) and thus GFC command value Ggfc becomes "0". As a result, the host vehicle runs at a constant speed by the GFC control.

During the time period (t2'-t3) from the point of time t2' to the point of time t3, ACC command value Gacc of vehicle-to-vehicle distance control tends to change to the vehicle-deceleration side (i.e., to the minus (−) side), due to the deceleration of the preceding vehicle. As a result, ACC command value Gacc of vehicle-to-vehicle distance control is selected as an output command value G* and hence the host vehicle decelerates by the vehicle-to-vehicle control of ACC control.

During the time period (t3-t4) from the point of time t3 to the point of time t4, a time rate of change Gy' in lateral acceleration acting on the host vehicle tends to decrease due to return steering of the steering wheel (i.e., a decrease in steering wheel angle δ) and thus GFC command value Ggfc tends to change (increase) to the vehicle-acceleration side (i.e., to the plus (+) side), but ACC command value Gacc of vehicle-to-vehicle distance control still exists on the vehicle-deceleration side (i.e., on the minus (−) side). As a result, ACC command value Gacc is selected as an output command value G* and hence the host vehicle continues to decelerate by the ACC control.

During the time period (t4-t5) from the point of time t4 to the point of time t5, GFC command value Ggfc becomes "0", but ACC command value Gacc of vehicle-to-vehicle distance control still exists on the vehicle-deceleration side (i.e., on the minus (−) side). Hence, the host vehicle continues to decelerate by the ACC control.

Figure 12:
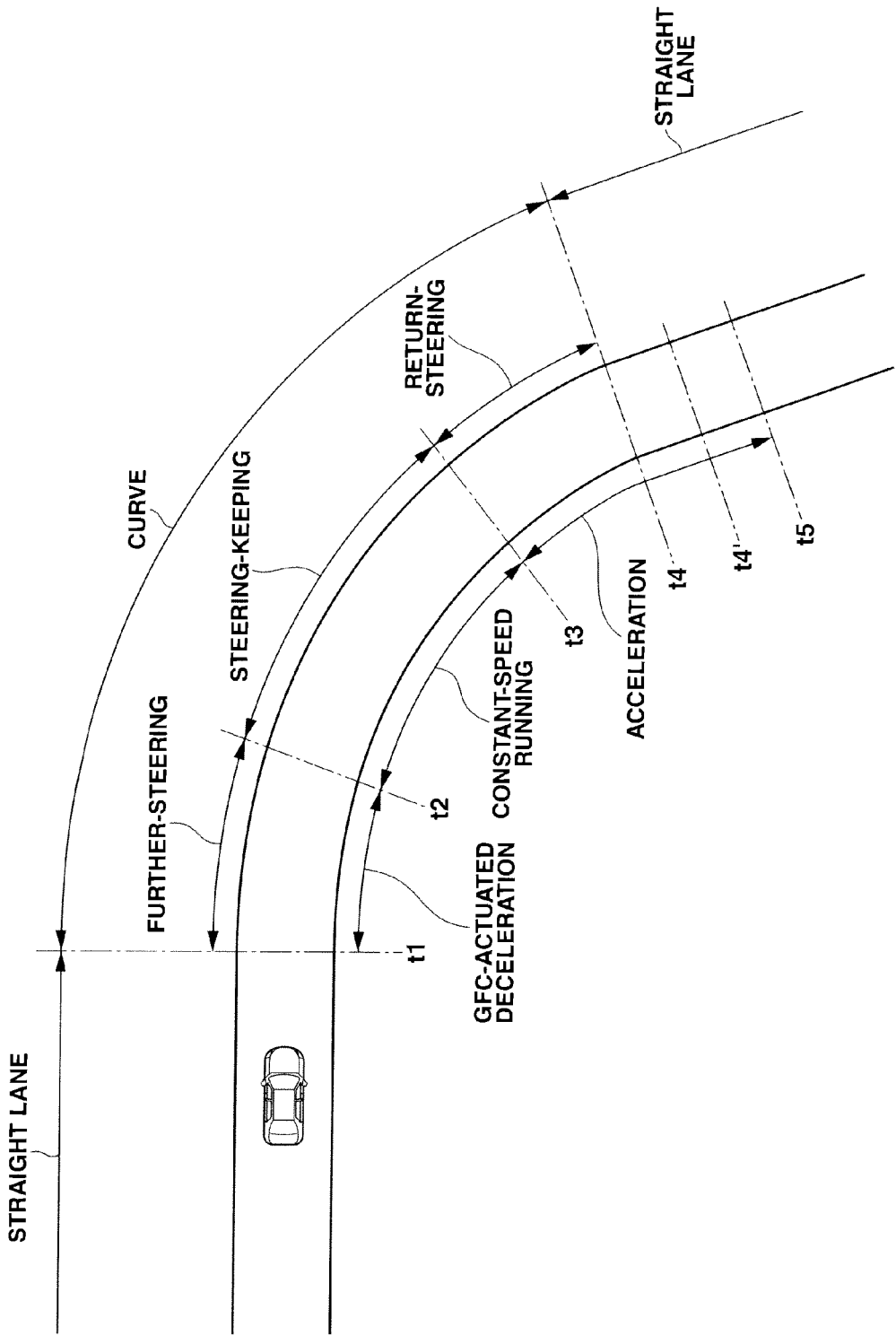
FIG. 12 is an explanatory view illustrating the relationship between a driver's steering state and an output command value G* when GFC control intervention has been made during cruise control, with a GFC command value alteration.

(4) With GFC control intervention during constant-speed control and with GFC command value alteration:

FIGS. 11A-11G are time charts illustrating speed self-adjustment control action when GFC control intervention has been made during constant-speed control, whereas FIG. 12 is the explanatory view illustrating the relationship between the driver's steering state and output command value G* when GFC control intervention has been made during constant-speed control. Additionally, in this situation, suppose that there is an alteration of GFC command value Ggfc, executed within GFC command value alteration section 204a.

The speed self-adjustment control actions, executed during the time period (t1-t3) from the point of time t1 to the point of time t3, are the same in the situations shown in FIGS. 5A-5F and 6 and shown in FIGS. 11A-11G and 12. Thus, detailed description of speed self-adjustment control action, executed during the time period (t3-t5) from the point of time t3 to the point of time t5, will be hereinafter described in detail in reference to the time charts of FIGS. 11A-11G and the explanatory view of FIG. 12, while detailed description of speed self-adjustment control action, executed during the time period (t1-t3) will be omitted because the above description thereon seems to be self-explanatory.

During the time period (t3-t4) from the point of time t3 to the point of time t4, a time rate of change Gy' in lateral acceleration acting on the host vehicle tends to decrease due to return steering of the steering wheel (i.e., a decrease in steering wheel angle δ) and thus GFC command value Ggfc changes (increases) to the vehicle-acceleration side (i.e., to the plus (+) side), and then reduces to zero. At this time, GFC command value alteration section 204a sets the output command value G* to a maximum value of GFC command value Ggfc, regardless of ACC command value Gacc of constant-speed control, until such time host vehicle speed V has approached the vehicle speed Vt0 (desired vehicle speed) at the point of time of detection of the host vehicle's entry into a curve. Thus, the host vehicle accelerates, because of the output command value G* set to the maximum value of GFC command value Ggfc.

During the time period (t4-t4') from the point of time t4 to the point of time t4', GFC command value Ggfc becomes "0", but the output command value G* is kept at the maximum value of GFC command value Ggfc by means of GFC command value alteration section 204a. Hence, the host vehicle continues to accelerate, because of the output command value G* set to the maximum value of GFC command value Ggfc.

At the early stage of the time period (t4'-t5) from the point of time t4' to the point of time t5, host vehicle speed V has approached the vehicle speed Vt0 (desired vehicle speed), and thus the output command value G* gradually reduces. At the point of time t5, the output command value G* becomes "0".

[Enhancement of Driving Stability of Vehicle Rounding a Curve]

According to the active cruise control (ACC) technology as described in JP2008-068752, when a host vehicle (an ACC-equipped vehicle) is rounding a curve, an upper-limit vehicle speed is set based on both a given target lateral acceleration and a host vehicle's turning radius determined based on a steering wheel angle, and then the host vehicle's speed is limited to below the computed upper-limit vehicle speed.

In contrast to the above, according to the speed self-adjustment control technology of the first embodiment, when a host vehicle (a speed-self-adjustment-control-system-equipped vehicle) is rounding a curve, in addition to ACC control, GFC control is carried out, for controlling host vehicle speed V by applying a longitudinal acceleration, determined depending on a time rate of change Gy' in lateral acceleration Gy acting on the host vehicle, to the host vehicle such that a yawing moment, occurring due to a load transfer in cornering, approaches closer to a reference yawing moment. The GFC control (i.e., GFC command value Ggfc) is based on the time rate of change Gy' in lateral acceleration, that is, the derivative dGy/dt of lateral acceleration. Hence, in comparison with the active cruise control technology as described in JP2008-068752, in which host vehicle speed V is controlled based on a lateral acceleration Gy acting on the ACC-equipped vehicle, the speed self-adjustment control technology of the first embodiment that can provide GFC control based on the derivative dGy/dt of lateral acceleration, is superior in rapid control intervention (rapid GFC control intervention) after the start of driver steering input. The rapid control intervention ensures a high responsiveness of the vehicle control system to driver steering input, and thus it is possible to more certainly bring the turning vehicle behavior closer to a desired value. For the reasons discussed above, according to the speed self-adjustment control technology of the first embodiment, it is possible to enhance driving stability as well as steering ability, when the host vehicle is rounding a curve.

[Suppression of Control Interference Between ACC Control and GFC Control]

By the way, ACC control and GFC control both introduce a function, which controls a speed of the host vehicle. Hence, in the case that the ACC control function and the GFC control function are both activated, there is a risk of control interference. As previously discussed, for instance, GFC control, based on the derivative dGy/dt of lateral acceleration, has a control characteristic that enables rapid control intervention after the start of driver steering input. Therefore, there is an increased tendency for vehicle deceleration control based on GFC control to intervene, before an ACC-actuated deceleration is carried out by ACC control, in other words, during the ACC-actuated acceleration stage that an acceleration has already been activated by ACC control. In such a case, ACC-actuated vehicle acceleration and GFC-actuated vehicle deceleration are alternately carried out. Thus, the host vehicle's acceleration and deceleration are repeatedly carried out, and whereby there is a risk of unnatural feeling that the driver experiences uncomfortable repetitions of acceleration and deceleration of the host vehicle.

In contrast, according to the speed self-adjustment control technology of the first embodiment, ACC command value Gacc is compared to GFC command value Ggfc, and then either one of GFC command value Ggfc and ACC command value Gacc, which produces a greater deceleration exerted on the host vehicle, is selected as an output command value G*, when the state of the host vehicle's entry from a straight lane into a curve is detected, so as to appropriately control the host vehicle's speed based on only the selected command value (i.e., output command value G*). Hence, in the state of the host vehicle entering a curve, it is possible to effectively suppress undesirable control interference between ACC control and GFC control. This eliminates or reduces any unnatural feeling that the driver experiences uncomfortable repetitions of acceleration and deceleration of the host vehicle. Additionally, by selecting a lower one of GFC command value Ggfc and ACC command value Gacc, which lower command value produces a greater vehicle deceleration, as an output command value G*, it is possible to enhance driving stability as well as steering ability in the state of the host vehicle entering a curve, while suppressing an excessive approach to the preceding vehicle.

When the state of the host vehicle's entry from a curve into a straight lane is detected, either one of GFC command value Ggfc and ACC command value Gacc, which produces a smaller acceleration exerted on the host vehicle, is selected as an output command value G*, so as to appropriately control the host vehicle's speed based on only the selected command value (i.e., output command value G*). Hence, in the state of the host vehicle leaving a curve, it is possible to effectively suppress undesirable control interference between ACC control and GFC control. This eliminates or reduces any unnatural feeling that the driver experiences uncomfortable repetitions of acceleration and deceleration of the host vehicle. Additionally, by selecting a lower one of GFC command value Ggfc and ACC command value Gacc, which lower command value produces a smaller vehicle acceleration, as an output command value G*, it is possible to enhance driving stability as well as steering ability in the state of the host vehicle leaving the curve, while suppressing an excessive approach to the preceding vehicle.

In the first embodiment, when the time rate of change Gy' (=dGy/dt) in lateral acceleration is substantially zero and thus lateral acceleration Gy is kept almost constant, that is, during a transition from the state of the host vehicle entering a curve to the state of the host vehicle leaving the curve, GFC command value calculation section 202 sets or adjusts GFC command value Ggfc to zero. Hence, during steady-state turning that steering wheel angle δ is kept constant by the driver (i.e., δ'=0), the host vehicle can run smoothly, while maintaining host vehicle speed V decelerated by GFC control in the state of the host vehicle's entry into the curve.

As previously discussed, under a condition where GFC command value Ggfc has been selected by means of command value selection section 203 as a command value that produces a smaller acceleration exerted on the host vehicle, GFC command value alteration section 204a is configured to set the output command value G* to a maximum value of GFC command value Ggfc regardless of ACC command value Gacc until such time host vehicle speed V has approached a vehicle speed Vt0 (desired vehicle speed) at a point of time of detection of the host vehicle's entry into a curve, and further configured to gradually reduce the output command value G* in a manner so as to bring host vehicle speed V closer to the vehicle speed Vt0 from a point of time immediately when host vehicle speed V has approached the vehicle speed Vt0 (desired vehicle speed) at the point of time of detection of the host vehicle's entry into a curve. Hereupon, GFC command value Ggfc depends on a time rate of change Gy' of lateral acceleration. The time rate of change Gy' of lateral acceleration varies depending on a way to return the steering wheel by the driver. For this reason, assuming that GFC command value Ggfc is used as an output command value G* without altering or compensating for the GFC command value Ggfc, for instance when a transition of the host vehicle's driving lane from a curve to a straight lane occurs, there is a risk that host vehicle speed V does not return to the vehicle speed Vt0 (desired vehicle speed) at the point of time of detection of the host vehicle's entry into the curve, thereby giving the driver unnatural feeling. Therefore, in the case that a target vehicle (a preceding vehicle) for vehicle-to-vehicle control does not exist and GFC command value Ggfc is selected as an output command value G* of the host vehicle leaving the curve, the output command value G* is compensated for or altered such that host vehicle speed V returns to the vehicle speed Vt0 (desired vehicle speed) at the point of time of detection of the host vehicle's entry into the curve, thus reducing any unnatural feeling experienced by the driver.

The vehicle control apparatus of the first embodiment can provide the following effects.

(1) The vehicle control apparatus of the first embodiment includes ACC command value calculation section 201 (included in the first speed self-adjustment control system) configured to calculate ACC command value Gacc of active cruise control (ACC control) that controls host vehicle speed V in a manner so as to maintain a preset interrelation (e.g., a relative distance) between the preceding vehicle and the host vehicle or to maintain a set speed, GFC command value calculation section 202 (included in the second speed self-adjustment control system) configured to calculate GFC command value Ggfc of G flow control (GFC control) that controls host vehicle speed V based on information about lateral acceleration Gy acting on the host vehicle (concretely, the time rate of change Gy' in lateral acceleration acting on the host vehicle), command value selection section 203 (serving as a deceleration selector) configured to select either one of ACC command value Gacc and GFC command value Ggfc, which selected command value (a deceleration command value) produces a greater deceleration exerted on the host vehicle, and speed control section 204 (included in brake ECU 102) configured to control host vehicle speed V by driving an actuator (brake fluid pressure unit 101 and/or engine 121) based on the selected command value of ACC command value Gacc and GFC command value Ggfc.

Thus, it is possible to enhance driving stability as well as steering ability, when the host vehicle is rounding a curve. Additionally, when the host vehicle is rounding a curve, it is possible to effectively suppress undesirable control interference between ACC control and GFC control, thus reducing any unnatural feeling experienced by the driver.

(2) Command value selection section 203 also serves as an acceleration selection section (an accelerator selector) configured to select either one of ACC command value Gacc and GFC command value Ggfc, which selected command value (an acceleration command value) produces a smaller acceleration exerted on the host vehicle. Hence, in a state of the host vehicle leaving a curve, it is possible to effectively suppress undesirable control interference between ACC control and GFC control, thus reducing any unnatural feeling experienced by the driver.

(3) GFC control introduces a function, which controls host vehicle speed V by application of a longitudinal acceleration/deceleration to the host vehicle, based on the information about lateral acceleration Gy acting on the host vehicle (concretely, the time rate of change Gy' in lateral acceleration acting on the host vehicle). Hence, it is possible to bring a yawing moment, occurring due to a load transfer in cornering, closer to a reference yawing moment, thereby enhancing steering ability together with driving stability, and ensuring good turning vehicle behavior.

(4) GFC command value calculation section 202 is further configured to set or adjust GFC command value Ggfc to zero, when it is determined, based on the information about lateral acceleration Gy (concretely, the time rate of change Gy' in lateral acceleration acting on the host vehicle), that lateral acceleration Gy acting on the host vehicle is kept substantially constant. Hence, during steady-state turning that steering wheel angle δ is kept constant by the driver (i.e., δ'=0), the host vehicle can run smoothly, while maintaining host vehicle speed V decelerated by GFC control in the state of the host vehicle's entry into the curve.

[Second Embodiment]

As hereunder described in detail, the vehicle control apparatus of the second embodiment differs from the first embodiment in calculating brake-fluid-pressure command value Pb*, but the other construction and system configuration are the same as the first embodiment.

In the case of the vehicle control apparatus of the second embodiment, in the expression (8), related to step S5 of the flowchart shown in FIG. 3 and required for calculating brake-fluid-pressure command value Pb* based on the selected output command value G*, the output-command-value-G*-to-brake-fluid-pressure conversion factor "K" is not set as a fixed value. That is, conversion factor "K" is set as a variable, which varies depending on a desired vehicle speed of active cruise control (ACC control).

Figure 13:
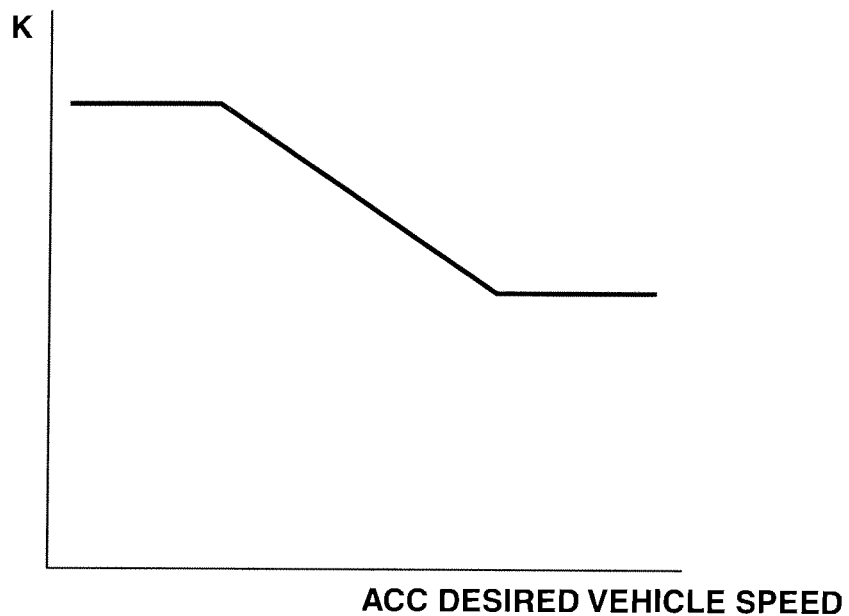
FIG. 13 is a preprogrammed map showing the relationship between a desired vehicle speed of active cruise control (ACC control) and a brake-fluid-pressure conversion factor K.

Referring now to FIG. 13, there is shown the preprogrammed map showing the relationship between the ACC desired vehicle speed and output-command-value-G*-to-brake-fluid-pressure conversion factor K. As appreciated from the characteristic map of FIG. 13, conversion factor K tends to decrease, as the ACC desired vehicle speed increases. Additionally, to prevent brake-fluid-pressure command value Pb* from becoming excessively large or excessively small, upper and lower limits of conversion factor K are set.

Hence, when the ACC desired vehicle speed is high, that is, when high-speed driving is required, conversion factor K becomes set to a smaller value, and thus brake-fluid-pressure command value Pb* becomes set to a smaller value, so as to produce a smaller longitudinal deceleration for the same data signal value of the information (e.g., Gy') about lateral acceleration Gy, as compared to a state where the ACC desired vehicle speed, set within the first speed self-adjustment control system, is low. Thus, when the host vehicle is running on a highway (a freeway) whose radius of curvature is greater than that of an ordinary road (a local road), it is possible to suppress an excessive vehicle deceleration due to GFC control in the state of the host vehicle's entry into the curve, thereby realizing automatic speed control (speed self-adjustment control) without giving the driver any unnatural feeling.

Instead of using the variable conversion factor K shown in FIG. 13, brake-fluid-pressure command value Pb* may be calculated and determined by the following expression (9).

$$Pb^* = (|G^*| - G1) \times K \quad (9)$$

where "G1" denotes an offset and "K" denotes a predetermined constant reference value.

Figure 14:
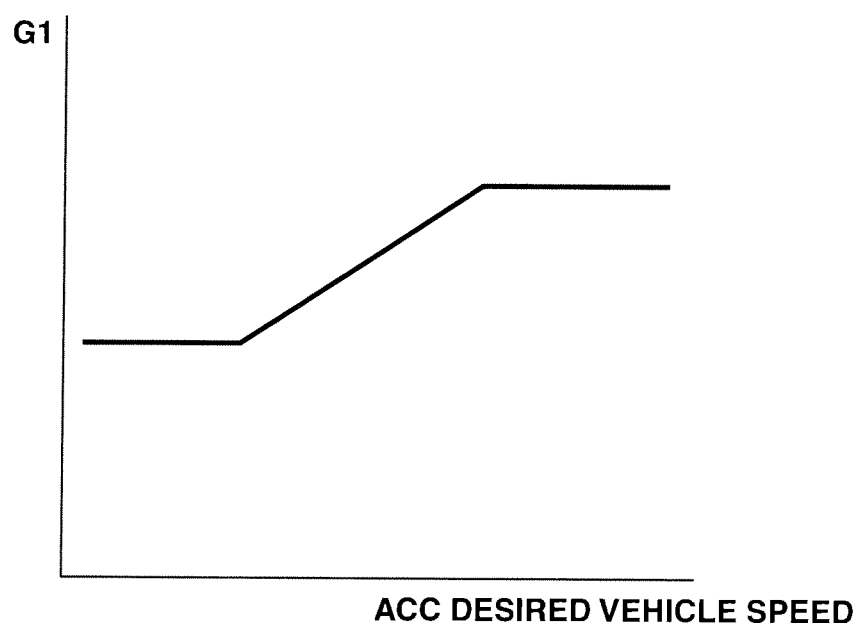
FIG. 14 is a preprogrammed map showing the relationship between a desired vehicle speed of active cruise control (ACC control) and an offset G1.

The previously-discussed offset "G1" is calculated or retrieved from a preprogrammed ACC desired vehicle speed versus offset G1 characteristic map of FIG. 14. As can be seen from the characteristic map of FIG. 14, offset G1 tends to increase, as the ACC desired vehicle speed increases. Additionally, to prevent brake-fluid-pressure command value Pb* from becoming excessively large or excessively small, upper and lower limits of offset G1 are set.

Hence, when the ACC desired vehicle speed is high, that is, when high-speed driving is required, offset G1 becomes set to a larger value, and thus brake-fluid-pressure command value Pb* becomes set to a smaller value. Thus, when the host vehicle is running on a highway (a freeway) whose radius of curvature is greater than that of an ordinary road (a local road), it is possible to suppress an excessive vehicle deceleration due to GFC control in the state of the host vehicle's entry into the curve, thereby realizing automatic speed control (speed self-adjustment control) without giving the driver any unnatural feeling.

The vehicle control apparatus of the second embodiment can provide the following effect (5) in addition to the effects (1)-(4) obtained by the first embodiment.

(5) GFC command value calculation section 202 is further configured to set brake-fluid-pressure command value Pb*, determined based on GFC command value Ggfc, to a smaller value in a manner so as to produce a smaller longitudinal deceleration, as a desired vehicle speed of ACC control increases.

Hence, when the host vehicle is running on a highway (a freeway) whose radius of curvature is greater than that of an ordinary road (a local road), it is possible to suppress an excessive vehicle deceleration due to GFC control in the state of the host vehicle's entry into the curve, thereby realizing automatic speed control (speed self-adjustment control) without giving the driver any unnatural feeling.

[Modifications]

The foregoing is a description of the preferred embodiments carried out the invention, it will be understood that the invention is not limited to the particular embodiments shown and described herein, but that various changes and modifications may be made without departing from the scope or spirit of this invention. In the previously-described embodiments, vehicle-to-vehicle distance control introduces a function, which a desired vehicle speed that the relative speed of the host vehicle to the preceding vehicle becomes zero is set, and then "speed" feedback control is performed to bring the host vehicle's speed closer to the desired vehicle speed. Instead of using such "speed" feedback control, "distance" feedback control may be used. In this case, a desired inter-vehicle distance (a desired vehicle-to-vehicle distance) is inputted or selected by the driver via a man-machine interface (e.g., an inter-vehicle distance set switch), and then "distance" feedback control is performed to bring the host vehicle's distance from the preceding vehicle closer to the desired inter-vehicle distance.

In the shown embodiments, constant-speed running control (simply, constant-speed control) introduces a function, which a desired vehicle speed is set to a preset upper-limit vehicle speed or a host vehicle's speed, detected when an ON-to-OFF transition of the brakes as well as the accelerator occurs, and then speed feedback control is performed to bring the host vehicle's speed closer to the desired vehicle speed (e.g., the preset upper-limit vehicle speed). In lieu thereof, a desired vehicle speed may be inputted or selected by the driver via a man-machine interface (e.g., a desired vehicle speed set switch).

Also, in the shown embodiments, GFC command value Ggfc is arithmetically calculated from the linear function defined by the expression Ggfc=$K_{G_yV}$·Gy', where the gain $K_{G_yV}$ is a proportional gain, and thus GFC command value Ggfc is calculated, based on information about a lateral acceleration acting on the host vehicle (concretely, the time rate of change Gy' (=dGy/dt) of lateral acceleration), in a linear fashion in a manner so as to be directly proportional to the time rate of change Gy' of lateral acceleration. Instead of using such a linear function f(Gy')=$K_{G_yV}$·Gy', GFC command value Ggfc may be computed or retrieved, based on information about a lateral acceleration acting on the host vehicle (concretely, the time rate of change Gy' (=dGy/dt) of lateral acceleration), in a non-linear fashion from a preprogrammed characteristic curve, which shows how GFC command value Ggfc has to be varied with respect to information about a lateral acceleration acting on the host vehicle (concretely, the time rate of change Gy' (=dGy/dt) of lateral acceleration) and in which GFC command value Ggfc is not proportional to a change of informational data signal value about the lateral acceleration acting on the host vehicle.

[Further Effects (Technical Ideas) of Embodiments]

The speed control apparatus of the shown embodiments can provide the following further effects (a)-(o).

(a) The vehicle control apparatus further includes a steering state detector, such as, steering angle sensor 112, camera 108, or lateral-G sensor 119, provided for detecting a driver's steering state. The control unit is configured to select a deceleration command value via the deceleration selector (command value selection section 203) when a state of the host vehicle entering from a straight lane to a curve has been detected by the steering state detector, and also configured to select an acceleration command value via the acceleration selector (command value selection section 203) when a state of the host vehicle entering from the curve to a straight lane has been detected by the steering state detector.

Thus, it is possible to enhance driving stability as well as steering ability in the state of the host vehicle entering a curve, while suppressing an excessive approach to the preceding vehicle.

(b) The host vehicle's speed V is controlled based on a lower one of the first command value Gacc and the second command value Ggfc during a transition from the state of the host vehicle entering the curve to the state of the host vehicle leaving the curve.

Thus, it is possible for the host vehicle to run smoothly, while maintaining host vehicle speed V decelerated by GFC control (the GFC command value) in the state of the host vehicle's entry into the curve.

(c) The control unit further comprises a second command value compensator (GFC command value alteration section 204a) provided for altering the second command value Ggfc so as to control the host vehicle's speed V to a vehicle speed Vt0 at a point of time t1 of detection of the host vehicle's entry into the curve, when the second command value Ggfc has been selected by the acceleration selector (command value selection section 203).

Hence, it is possible to return the vehicle speed of the host vehicle leaving the curve to the vehicle speed Vt0 of the host vehicle entering the curve, thus reducing any unnatural feeling experienced by the drover.

(d) A vehicle control apparatus includes a vehicle-to-vehicle distance control system (related to vehicle following control of active cruise control) configured to drive an actuator (i.e., brake fluid pressure unit 101 and/or engine 121) based on a vehicle-to-vehicle distance control command value Gacc in a manner so as to maintain a preset distance of a host vehicle from a preceding vehicle, a constant-speed control system (related to normal cruise control of active cruise control) configured to drive the actuator based on a constant-speed control command value Gacc in a manner so as to maintain a preset speed of the host vehicle, a curve-turning vehicle speed control system (related to G flow control, that is, integrated control between the vehicle motion in the longitudinal direction and the vehicle motion in the lateral direction) configured to control a speed V of the host vehicle based on a curve-turning vehicle speed control command value Ggfc determined based on information (e.g., Gy') about a lateral acceleration Gy acting on the host vehicle, and a control unit configured to select, depending on a running condition of the host vehicle, either one of the vehicle-to-vehicle distance control command value Gacc, the constant-speed control command value Gacc, and the curve-turning vehicle speed control command value Ggfc, and also configured to drive the actuator based on the selected command value of the three command values.

Thus, it is possible to enhance driving stability as well as steering ability, when the host vehicle is rounding a curve.

(e) The control unit further includes a deceleration selector (command value selection section 203) configured to select either one of the vehicle-to-vehicle distance control command value Gacc, the constant-speed control command value Gacc, and the curve-turning vehicle speed control command value Ggfc, which selected command value is a deceleration command value for producing a greater deceleration exerted on the host vehicle.

Thus, in the state of the host vehicle entering a curve, it is possible to effectively suppress undesirable control interference between ACC control (either vehicle-to-vehicle distance control or constant-speed control) and GFC control (curve-turning vehicle speed control).

(f) The control unit further comprises an acceleration selector (command value selection section 203) configured to select either one of the vehicle-to-vehicle distance control command value Gacc, the constant-speed control command value Gacc, and the curve-turning vehicle speed control command value Ggfc, which selected command value is an acceleration command value for producing a smaller acceleration exerted on the host vehicle.

Thus, in the state of the host vehicle leaving a curve, it is possible to effectively suppress undesirable control interference between ACC control (either vehicle-to-vehicle distance control or constant-speed control) and GFC control (curve-turning vehicle speed control).

(g) The curve-turning vehicle speed control system is configured to control the host vehicle's speed V by application of a longitudinal acceleration/deceleration to the host vehicle, based on the information (e.g., Gy') about the lateral acceleration Gy acting on the host vehicle.

Thus, it is possible to bring a yawing moment, occurring due to a load transfer in cornering, closer to a reference yawing moment, thereby enhancing steering ability together with driving stability, and ensuring good turning vehicle behavior.

(h) The control unit is further configured to produce a smaller longitudinal acceleration/deceleration for the same data signal value of the information (e.g., Gy') about the lateral acceleration Gy, when the set speed, set within the constant-speed control system, is high, as compared to a state where the set speed is low.

Thus, when the host vehicle is running on a highway (a freeway) whose radius of curvature is greater than that of an ordinary road (a local road), it is possible to suppress an excessive vehicle deceleration due to GFC control (curve-turning vehicle speed control) in the state of the host vehicle's entry into the curve, thereby realizing automatic speed control (speed self-adjustment control) without giving the driver any unnatural feeling.

(i) The curve-turning vehicle speed control system is further configured to set the curve-turning vehicle speed control command value Ggfc to zero, when it is determined, based on the information (e.g., Gy') about the lateral acceleration Gy, that the lateral acceleration Gy acting on the host vehicle is kept substantially constant.

Thus, during steady-state turning that steering wheel angle $\delta$ is kept constant by the driver (i.e., $\delta'=0$), the host vehicle can run smoothly, while maintaining host vehicle speed V decelerated by GFC control (curve-turning vehicle speed control) in the state of the host vehicle's entry into the curve.

(j) The vehicle control apparatus further includes a steering state detector, such as, steering angle sensor 112, camera 108, or lateral-G sensor 119, provided for detecting a driver's steering state. The control unit is configured to select the deceleration command value via the deceleration selector (command value selection section 203) when a state of the host vehicle entering from a straight lane to a curve has been detected by the steering state detector, and also configured to select the acceleration command value via the acceleration selector (command value selection section 203) when a state of the host vehicle entering from the curve to a straight lane has been detected by the steering state detector.

Thus, it is possible to enhance driving stability as well as steering ability when the host vehicle is rounding a curve, while suppressing an excessive approach to the preceding vehicle.

(k) The vehicle control apparatus further includes a forward situation recognition device (e.g., camera 108) provided for detecting or determining the presence or absence of the preceding vehicle traveling ahead of the host vehicle. The control unit is configured to select either one of the vehicle-to-vehicle distance control command value Gacc and the constant-speed control command value Gacc, based on a result of decision about the presence or absence of the preceding vehicle during a transition from the state of the host vehicle entering the curve to the state of the host vehicle leaving the curve, and also configured to control the host vehicle's speed V based on a lower one of the curve-turning vehicle speed control command value Ggfc and the selected command value of the vehicle-to-vehicle distance control command value Gacc and the constant-speed control command value Gacc.

Thus, it is possible to switch between vehicle-to-vehicle distance control and constant-speed control, based on the result of decision about the presence or absence of the preceding vehicle.

(l) The control unit is configured to control the host vehicle's speed V based on a lower one of the curve-turning vehicle speed control command value Ggfc and the vehicle-to-vehicle distance control command value Gacc, when the preceding vehicle has been recognized via the forward situation recognition device (e.g., camera 108) during the transition from the state of the host vehicle entering the curve to the state of the host vehicle leaving the curve.

Thus, it is possible to maintain the interrelation (i.e., the relative distance) between the host vehicle and the preceding vehicle.

(m) The control unit is configured to control the host vehicle's speed V based on a lower one of the curve-turning vehicle speed control command value Ggfc and the constant-speed control command value Gacc, when the preceding vehicle has not yet been recognized via the forward situation recognition device (e.g., camera 108) during the transition from the state of the host vehicle entering the curve to the state of the host vehicle leaving the curve.

This enables the host vehicle to run at a constant speed when the preceding vehicle, traveling ahead of the host vehicle, does not exist.

(n) The control unit further includes a command value compensator (GFC command value alteration section 204a) provided for altering the curve-turning vehicle speed control command value Ggfc so as to control the host vehicle's speed V to a vehicle speed Vt0 at a point of time t1 of detection of the host vehicle's entry into the curve, when the curve-turning vehicle speed control command value Ggfc has been selected by the acceleration selector (command value selection section 203).

Hence, it is possible to return the vehicle speed of the host vehicle leaving the curve to the vehicle speed Vt0 of the host vehicle entering the curve, thus reducing any unnatural feeling experienced by the drover.

(o) A vehicle control apparatus includes a first speed self-adjustment control system (related to active cruise control) configured to control a speed V of a host vehicle by operating, based on a first command value Gacc, a braking system or a driving system, and by executing acceleration/deceleration control for the host vehicle in a manner so as to maintain a distance of the host vehicle from a preceding vehicle or to maintain a set speed, a second speed self-adjustment control system (related to G flow control, that is, integrated control between the vehicle motion in the longitudinal direction and the vehicle motion in the lateral direction) configured to control the host vehicle's speed V by operating, based on a second command value Ggfc determined based on information (e.g., Gy') about a lateral acceleration Gy acting on the host vehicle, the braking system or the driving system, and by executing acceleration/deceleration control for the host vehicle, a deceleration selector (command value selection section 203) configured to select either one of the first command value Gacc and the second command value Ggfc, which selected command value is a deceleration command value for producing a greater deceleration exerted on the host vehicle, during the deceleration control, an acceleration selector (command value selection section 203) configured to select either one of the first command value Gacc and the second command value Ggfc, which selected command value is an acceleration command value for producing a smaller acceleration exerted on the host vehicle, during the acceleration control, and a control unit configured to control the host vehicle's speed V based on the selected command value, by operating the braking system when the selected command value is the deceleration command value selected by the deceleration selector (command value selection section 203) and by operating the driving system when the selected command value is the acceleration command value selected by the acceleration selector (command value selection section 203).

Thus, it is possible to enhance driving stability as well as steering ability when the host vehicle is rounding a curve, while suppressing an excessive approach to the preceding vehicle.

The entire contents of Japanese Patent Application No. 2010-276484 (filed Dec. 13, 2010) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle control apparatus comprising:
   (a) a first speed self-adjustment control system configured to control a speed of a host vehicle based on a first command value, in a manner so as to maintain a distance of the host vehicle from a preceding vehicle or to maintain a set speed;
   (b) a second speed self-adjustment control system configured to control the speed of the host vehicle by application of a longitudinal acceleration/deceleration to the host vehicle, based on a second command value determined based on a time rate of change in a lateral acceleration acting on the host vehicle when the host vehicle is rounding a curve;
   (c) a deceleration selector configured to select either one of the first command value and the second command value, which selected command value is a deceleration command value so as to produce a greater deceleration exerted on the host vehicle;
   (d) an acceleration selector configured to select either one of the first command value and the second command value, which selected command value is an acceleration command value so as to produce a smaller acceleration exerted on the host vehicle; and
   (e) a control unit configured to control the speed of the host vehicle by driving an actuator based on the selected command value.

2. The vehicle control apparatus as claimed in claim 1, wherein:
   the second speed self-adjustment control system is further configured to set the second command value to zero, when it is determined, based on the time rate of change in the lateral acceleration, that the lateral acceleration acting on the host vehicle is kept substantially constant.

3. The vehicle control apparatus as claimed in claim 1, wherein:
   the control unit is further configured to produce a smaller longitudinal acceleration/deceleration for the same data signal value of the time rate of change in the lateral acceleration, when the set speed, set within the first speed self-adjustment control system, is high, as compared to a state where the set speed, set within the first speed self-adjustment control system, is low.

4. The vehicle control apparatus as claimed in claim 1, further comprising:
   a steering state detector configured to detect a steering state of a driver,
   wherein the control unit is configured to
      select the deceleration command value via the deceleration selector when a state of the host vehicle entering from a straight lane to a curve has been detected by the steering state detector, and
      select the acceleration command value via the acceleration selector when a state of the host vehicle entering from the curve to a straight lane has been detected by the steering state detector.

5. The vehicle control apparatus as claimed in claim 4, wherein:
   the speed of the host vehicle is controlled based on a lower one of the first command value and the second command value during a transition from the state of the host vehicle entering the curve to the state of the host vehicle leaving the curve.

6. The vehicle control apparatus as claimed in claim 5, wherein:
   the control unit further comprises a second command value compensator configured to alter the second command value so as to control the speed of the host vehicle to a vehicle speed at a point of time of detection of an entry of the host vehicle into the curve, when the second command value has been selected by the acceleration selector.

* * * * *